US008463297B2

(12) United States Patent
Bull et al.

(10) Patent No.: US 8,463,297 B2
(45) Date of Patent: Jun. 11, 2013

(54) SUBSCRIBER SELECTIVE, AREA-BASED SERVICE CONTROL

(75) Inventors: Jeffrey F. Bull, Chalfont, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 1095 days.

(21) Appl. No.: 11/965,481

(22) Filed: Dec. 27, 2007

(65) Prior Publication Data

US 2009/0170528 A1 Jul. 2, 2009

(51) Int. Cl.
*H04W 24/00* (2009.01)
*H04M 11/04* (2006.01)
*H04M 3/493* (2006.01)
*H04M 1/00* (2006.01)
*H04B 7/00* (2006.01)

(52) U.S. Cl.
USPC ............. 455/456.4; 455/404.1; 455/414.2; 455/456.1; 455/515; 455/569.1; 725/35

(58) Field of Classification Search
USPC .......... 455/404.2, 456.1–456.4, 414.1, 404.1, 455/414.2, 457, 515, 516, 517, 569.1; 725/35; 705/14.58
See application file for complete search history.

(56) References Cited

U.S. PATENT DOCUMENTS

| | | | |
|---|---|---|---|
| 5,327,144 A | 7/1994 | Stilp | 1/342 |
| 6,047,192 A | 4/2000 | Maloney et al. | 455/456.2 |
| 6,184,829 B1 | 2/2001 | Stilp | 342/387 |
| 6,317,604 B1 | 11/2001 | Kovach | 455/456 |
| 6,782,264 B2 | 8/2004 | Anderson | 455/456 |
| 7,167,713 B2 | 1/2007 | Anderson | 455/456.1 |
| 2003/0008668 A1* | 1/2003 | Perez-Breva et al. | 455/456 |
| 2004/0203885 A1* | 10/2004 | Quaid | 455/456.1 |
| 2005/0013417 A1* | 1/2005 | Zimmers et al. | 379/37 |
| 2005/0014516 A1* | 1/2005 | Rached et al. | 455/456.1 |
| 2005/0020240 A1* | 1/2005 | Minter | 455/404.1 |
| 2006/0003775 A1 | 1/2006 | Bull | 455/456.1 |

(Continued)

OTHER PUBLICATIONS

Schneider, D., "The Silence of the Cellphones," http://www.spectrum.ieee.org/print/8248, first published Apr. 2009, 2 pages.

(Continued)

*Primary Examiner* — George Eng
*Assistant Examiner* — Inder Mehra
(74) *Attorney, Agent, or Firm* — Woodcock Washburn LLP

(57) ABSTRACT

A method for use in controlling a mobile device's access to one or more wireless communications networks (WCNs) with an overlaid wireless location system (WLS) includes monitoring a set of one or more predefined signaling links of at least one WCN, and detecting an event associated with the mobile device. Next, using a low-accuracy location function of the WLS, the system determines that the mobile device is within a defined area of interest and is potentially within a defined quiet zone. Next, using a high-accuracy location function of the WLS, the system determines a precise geographic location of the mobile device and based thereon confirms that the mobile device is within the quiet zone or at least within an area of ambiguity around the quiet zone. Finally, the mobile device's access to the wireless communications network is limited, e.g., according to a pre-defined rule established by the carrier. This approach allows finer definition of the fenced area while also minimizing the load on the high-accuracy location function. The proximity threshold is preferably based on the accuracy of the underlying location technology.

36 Claims, 14 Drawing Sheets

U.S. PATENT DOCUMENTS

| | | | | |
|---|---|---|---|---|
| 2006/0030333 | A1 | 2/2006 | Ward | 455/456.1 |
| 2006/0046746 | A1* | 3/2006 | Ranford et al. | 455/456.5 |
| 2006/0135174 | A1* | 6/2006 | Kraufvelin et al. | 455/456.1 |
| 2009/0131080 | A1* | 5/2009 | Nadler et al. | 455/456.3 |
| 2010/0015977 | A1* | 1/2010 | Francalanci et al. | 455/435.1 |
| 2010/0197324 | A1* | 8/2010 | Bolin et al. | 455/456.3 |
| 2010/0216509 | A1* | 8/2010 | Riemer et al. | 455/557 |

OTHER PUBLICATIONS

International Search Report and Written Opinion, dated Feb. 9, 2009, 10 pages.

Grech, M., "Customized Applications for Mobile network Enhanced Logic (CAMEL); Service description; Stage 1," 3GPP TS 22.078, downloaded 2008, 1-4.

Hamann, C., "Customized Applications for Mobile network Enhanced Logic (CAMEL) Phase X; Stage 2," 3GPP TS 23.078, downloaded 2008, 1-4.

Hodges, P., "Customized Applications for Mobile network Enhanced Logic (CAMEL) Phase X; CAMEL Application Part (CAP) specification," 3GPP TS 29.078, downloaded 2008, 1-4.

"Win Phase 1," 3$^{rd}$ Generation Partnership Project 2 "3GPP2", http://www.3gpp2.org/Public_html/specs/N.S0013-0_v1.0.pdf, downloaded 2008, 1-658.

"TIA-EIA-41-D Pre-Paid Charging," 3GPP2, http://www.3gpp2.org/Public_html/specs/NS0018Re.pdf, 2000, 1-383.

"Win Phase 2: Triggers for Preferred Language, Advice of Charge, Rejection of Undesired Annoying Calls, Premium Rate Charging, Freephone," 3GPP2, http://www.3gpp2.org/Public_html/specs/N.S0004.pdf, 2001, 1-295.

"Pre-Paid Charging Enhancements for Circuit Switched Data and Short Message Services," 3GPP2, http://www.3gpp2.org/Public_html/specs/X.S0010-A_v1.0_010504.pdf, 2004, 1-189.

"Wireless Intelligent Network Support for Location Based Services," 3GPP2, http://www.3gpp2.org/Public_html/specs/X.S0009-0%20v1.0_040706.pdf, 2004, 1-151.

* cited by examiner

SUBSCRIBER SELECTIVE, AREA-BASED SERVICE CONTROL

TECHNICAL FIELD

The subject matter described herein relates generally to methods and apparatus for locating wireless devices, also called mobile devices or mobile stations (MS), such as those used in analog or digital cellular systems, personal communications systems (PCS), enhanced specialized mobile radios (ESMRs), and other types of wireless communications systems. More particularly, but not exclusively, the described subject matter relates to using near real time location techniques with wireless intelligent network (WIN) services triggering techniques to control access or use of a wireless communications network (WCN) based on defined rules, which may be determined by the wireless carrier or operator. Still more particularly, we described systems and methods for providing wireless carriers with the ability to define geographic regions—sometimes referred to as "quiet zones" or "cold zones"—in which access to the WCN is controlled. For example, the operator of the WCN may selectively grant or deny wireless service to specific mobile devices within the quiet zone or within an area of interest encompassing the quiet zone based upon the mobile device's proximity to, or speed toward, the quiet zone. The disclosed systems and methods may also be used, e.g., to disable mobile device communications if the mobile device is traveling in the area of interest above or below a set speed threshold.

BACKGROUND

This subject matter described in this application is related to the subject matter described in co-pending U.S. application Ser. No. 11/198,996, filed Aug. 8, 2005, entitled "Geo-fencing in a Wireless Location System," the entirety of which is hereby incorporated by reference. The aforementioned application Ser. No. 11/198,996 is a continuation of U.S. application Ser. No. 11/150,414, filed Jun. 10, 2005, entitled "Advanced Triggers for Location-Based Service Applications in a Wireless Location System," which is a continuation-in-part of U.S. application Ser. No. 10/768,587, filed Jan. 29, 2004, entitled "Monitoring of Call Information in a Wireless Location System", now U.S. Pat. No. 7,167,713, which is a continuation of U.S. application Ser. No. 09/909,221, filed Jul. 18, 2001, entitled "Monitoring of Call Information in a Wireless Location System," now U.S. Pat. No. 6,782,264 B2, which is a continuation-in-part of U.S. application Ser. No. 09/539,352, filed Mar. 31, 2000, entitled "Centralized Database for a Wireless Location System," now U.S. Pat. No. 6,317,604 B1, which is a continuation of U.S. application Ser. No. 09/227,764, filed Jan. 8, 1999, entitled "Calibration for Wireless Location System", now U.S. Pat. No. 6,184,829 B1.

A. Wireless Location

Early work relating to Wireless Location Systems is described in U.S. Pat. No. 5,327,144, Jul. 5, 1994, "Cellular Telephone Location System," which discloses a system for locating cellular telephones using time difference of arrival (TDOA) techniques. This and other exemplary patents (discussed below) are assigned to TruePosition, Inc., the assignee of the present invention. The '144 patent describes what may be referred to as an uplink-time-difference-of-arrival (U-TDOA) cellular telephone location system. The described system may be configured to monitor control channel transmissions from one or more cellular telephones and to use central or station-based processing to compute the geographic location(s) of the phone(s). TruePosition and others have continued to develop significant enhancements to the original inventive concepts.

B. Wireless Intelligent Networking

The wireless intelligent network (WIN) is a network architecture designed for mobile telecommunications networks. It allows operators to provide value-added services in addition to the standard telecommunications services such as call connection services on mobile phones and devices. The WIN moves service control away from the switching center (the mobile switching center or MSC) and up to a higher-level element in the network.

The WIN system is a subset of a larger family of telecommunications network services and protocols, collectively called Intelligent Networks (IN). A complete description of the IN emerged in a series of ITU-T recommendations. ITU standards defined a complete architecture including the architectural view, state machines, physical implementation and protocols. The first ITU-T series was called Capability Set One (CS-1), numbered as recommendations Q.1210 to Q.1219. The second ITU-T series was called Capability Set Two (CS-2), numbered as recommendations Q.1220 to Q.1229.

Two variants of wireless intelligent networking have evolved, loosely based on the ITU-T recommendations. Each WIN variant was developed under he auspices of a telecommunications standards setting body. The North American variant is known as Advanced Intelligent Networking (AIN) as standardized by the American National Standards Institute (ANSI). The European (and now world-wide) variant is known as Customized Applications for Mobile networks Enhanced Logic (CAMEL), as named by European Telecommunications Standards Institute (ETSI). Although both WIN standards were developed separately and the details of each protocol differ radically, the basic concepts are similar, both borrowing heavily from the ITU-T IN recommendations and both needing to satisfy the requirements of wireless operators to match competitive services offerings.

The most fundamental ability of WIN is to support remote call-processing control through a service-control function (SCF), which is basically an AIN-defined Service Control Point (SCP). When a mobile device registers with the wireless system, the wireless network will collect information over the radio interface allowing the network to register and obtain the subscriber's profile, including the subscription information from the device's Home Location Register (HLR). The subscription information includes the device's trigger detection profile (TDP), which describes the situations that will cause Intelligent Networking service logic to be invoked. In addition to triggers received from the device's HLR, the serving MSC may have its own list of static triggers to apply to all originating or terminating events.

It is these triggers which are used to define the conditions under which the AIN (SCP) or CAMEL (gsmSCF-based) external call-processing logic (the service logic) is invoked. The service logic could determine that the trigger was not really required and use a message to tell the MSC to continue processing as if the trigger never happened. This might seem redundant, but triggers are limited to general call events, resulting in "false positives". If the WIN trigger is a general trigger, such as mobile origination, the service logic may have more complex entry criteria, allowing the call to proceed without added delay if the service entry criteria are not met.

Embodiments of the present invention use the basic WIN techniques as well as the standardized messaging and interfaces. Certain extensions to standardized triggers may be required as well as modifications to the MSC depending on the MSC vendor and/or network operator's implementation of WIN capabilities. The functionality and capabilities provided by the WIN triggers and WIN state machines may also be transferred directly to the MSC or packet-based Soft-Switch.

ANSI-WIN or AIN

The WIN capabilities developed thus far are service independent. The following three standards packages have been or are being developed by the TIA (Telecommunications Industry Association) TR-45 Engineering Committee:

Package 1 (WIN Phase I): Defines the architecture, provides the first batch of triggers and capabilities for basic call origination and call termination, and supports basic services such as Calling Name Presentation, Incoming Call Screening and Voice Controlled services. (Standards documentation has been published as TIA/EIA/IS-771).

Package 2 (WIN Phase II): Adds the second batch of triggers and capabilities, and supports Charging Services such as Prepaid, Freephone, Premium Rate, and Advice of Charging. (Standards documentation has been recommended for publication as TIA/EIA/IS-826 for Prepaid and 848 for other Charging Services).

Package 3 (WIN Phase III): Adds the third batch of triggers and capabilities, and supports Location Based Services such as Location Based Charging, Fleet and Asset Management, Location Based Information Service, and Enhanced Calling Routing. (Standard documentation is currently being under development and will be published as TIA/EIA/IS-843).

CAMEL

The complete CAMEL detailed functionalities descriptions are described in CAMEL specifications TS 22.078 (stage 1), TS 23.078 (stage 2) and TS 29.078 (stage 3).

Phase 1—CAMEL Phase 1 defined only very basic call control services, but introduced the concept of a CAMEL Basic Call State Model (BCSM) to the Intelligent Network (IN). Phase 1 gave the gsmSCF the ability to bar calls (release the call prior to connection), allow a call to continue unchanged, or to modify a limited number of call parameters before allowing it to continue. The gsmSCF could also monitor the status of a call for certain events (call connection and disconnection), and take appropriate action on being informed of the event.

Phase 2—CAMEL Phase 2 enhanced the capabilities defined in Phase 1. In addition to supporting the facilities of Phase 1, Phase 2 included:

Additional event detection points;

Interaction between a user and a service using announcements, voice prompting and information collection via in-band interaction or Unstructured Supplementary Service Data (USSD) interaction; and Control of call duration and transfer of Advice of Charge Information to the mobile station.

The gsmSCF can be informed about the invocation of the supplementary services Explicit Call Transfer (ECT), Call Deflection (CD) and Multi-Party Calls (MPTY). For easier post-processing, charging information from a serving node can be integrated in normal call records.

Phase 3—The third phase of CAMEL enhanced the capabilities of Phase 2. The following capabilities were added:

Support of facilities to avoid overload;

Capabilities to support Dialed Services;

Capabilities to handle mobility events, such as (Not-) reachability and roaming;

Control of GPRS sessions and PDP contexts;

Control of Mobile Originated SMS through both circuit switched and packet switched serving network entities; and Interworking with SoLSA (Support of Localised Service Area). Support for this interworking is optional.

The gsmSCF can be informed about the invocation of the supplementary service Call Completion to Busy Subscriber (CCBS).

Phase 4—The fourth phase of CAMEL built on the capabilities of Phase 3. The following features were defined:

CAMEL support for Optimal Routing of circuit-switched mobile-to-mobile calls;

The capability for the gsmSCF to create additional parties in an existing call (Call Party Handling);

The capability for the gsmSCF to create a new call unrelated to any other existing call (Call Party Handling—new call);

Capabilities for the enhanced handling of call party connections (Call Party Handling);

Control of Mobile Terminated SMS through both circuit switched and packet switched serving network entities;

The capability for the gsmSCF to control sessions in the IP Multimedia Subsystem (IMS); and The gsmSCF can request the gsmSCF to play a fixed or a variable sequence of tones.

With CAMEL Phase 4, it is possible that only a limited subset of the new functionalities is supported, in addition to the complete support of CAMEL Phase 3.

The inventive techniques and concepts described herein apply to time and frequency division multiplexed (TDMA/FDMA) radio communications systems including the widely used IS-136 (TDMA), GSM, and OFDM wireless systems, as well as code-division radio communications systems such as CDMA (IS-95, IS-2000) and Universal Mobile Telecommunications System (UMTS), the latter of which is also known as W-CDMA. The Global System for Mobile (GSM) model discussed above is an exemplary but not exclusive environment in which the present invention may be used.

Currently, denial of service at specific sites is accomplished by radio jammers. Cell phone jammers are devices that create a temporary "dead zone" to all cell phone traffic in their immediate proximity. Jammers are legally used by the police and military to control or disrupt communication during hostage situations and bomb threats. Although illegal in many countries, personal and premise cell phone jammers are increasingly available and decreasing in size and cost.

SUMMARY

Embodiments of the present invention may be used to replicate the service provided by cell phone radio jammers without blocking emergency services calls and interfering with the operation of the wireless network provider's (WNP) radio network. As described in U.S. application Ser. No. 11/198,996, a geo-fencing location-based service application can be triggered by reconfiguring the operator's network and then relying on the standard behavior of a mobile device to transmit when transiting between paging areas. Using a link monitoring system (LMS) as described in U.S. Pat. No. 6,782, 264, "Monitoring of Call Information in a Wireless Location System," and expanded in U.S. patent application Ser. No. 11/150,414, "Advanced Triggers for Location-based Service Applications in a Wireless Location System," a mobile device transmission or network transaction may be monitored and mobile device identity information, low-accuracy location (cell ID, sector ID, timing advance, round-trip-time, or one-way-delay), received downlink (BTS-to-mobile) signal power levels and radio channel information (e.g., frequency, timeslot, hop pattern, code sequence, etc.) extracted. The inventive concept expands on the previously taught geo-fencing concept by allowing the operator to selectively allow service within the paging area or within an enclosed area of interest using a wireless intelligent network for call control based on location.

Wireless Communications Networks (WCN) are designed to provide communications over the geographic area in which they are deployed. However, within the coverage area, there are certain geographic areas/volumes, which can be described by a two or three dimensional polygon, with respect to which it is desired to deny or control wireless service to the general subscriber population, with the possible exception of certain subscribers that are pre-identified (e.g., on a white list). Denial of wireless service can be accomplished in many ways, including disabling of the radio coverage to the area, employing radio jammers, denial of services based on a multi-cell service area, or denying service based on the cell/sector of origin or termination for the transaction.

Embodiments of the present invention improve on the existing methods by allowing for finer resolution for service denial with exclusion areas set as a subset of a cell or sector. Exclusion areas may also be set as subsections of adjoining cells or sectors or adjoining wireless networks. Also unique to the illustrative embodiments is the ability to deny service based on altitude, speed, heading, or priority. The inventive systems and methods described herein use the ability of wireless intelligent networking to signal when an initiation event (origination or termination) occurs at the Mobile Switching Center and the WIN's ability to allow call handling mid-call with the capabilities of passive network monitoring and high-accuracy wireless location to provide the selective area-based call denial service.

An exemplary method for use in controlling a mobile device's access to one or more wireless communications networks (WCNs) with an overlaid wireless location system (WLS) includes monitoring a set of one or more predefined signaling links of at least one WCN, and detecting an event associated with the mobile device. Next, using a low-accuracy location function of the WLS, the system determines that the mobile device is within a defined area of interest and is potentially within a defined quiet zone. Next, using a high-accuracy location function of the WLS, the system determines a precise geographic location of the mobile device and based thereon confirms that the mobile device is within the quiet zone or at least within an area of ambiguity around the quiet zone. Finally, the mobile device's access to the wireless communications network is limited, e.g., according to a pre-defined rule established by the carrier. This approach allows finer definition of the fenced area while also minimizing the load on the high-accuracy location function. The proximity threshold is preferably based on the accuracy of the underlying location technology.

This invention expands on the previously defined geo-fencing concepts by using a series of location methods to better define the geo-fenced quiet zone while minimizing load on the WCN and the Intelligent Network. The inventive systems and methods also allow selectable outside actions against intruding mobile devices. For example, the outside action can include 1) denial of service, 2) connection allowed but with lawful-intercept recording or establishment of three-way call with local authorities, or 3) re-routing of the call to a message center.

Other aspects of the present invention are described below.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problem and then a more detailed description of our solutions. The GSM radio access network and the CAMEL IN are presented as illustrative examples and are not intended to limit the scope of the invention.

To control the availability of services to mobile devices based on location within a defined area, voice calls, SMS messaging, and GPRS data sessions may be located and a method to deny service defined. This system should function with minimal impact to allowed subscribers and function immediately to deny service.

Figure 7:
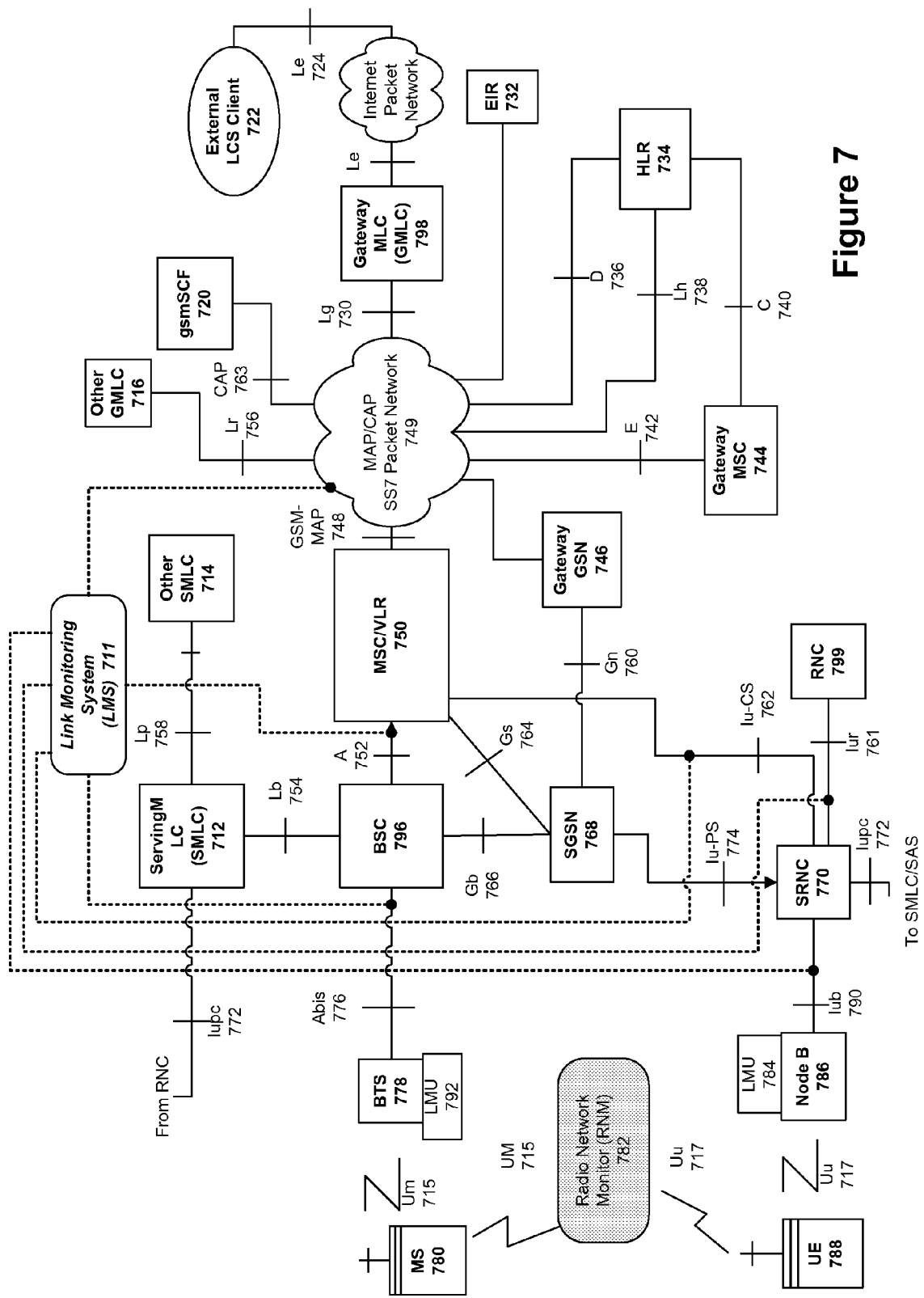
FIG. 7 is a schematic representation of the functional components of the GSM and UMTS Radio Access Networks.

Exemplary wireless location systems (e.g., the TruePosition Finder™ U-TDOA or UTDOA/AoA location system, and the systems described in U.S. Pat. No. 5,327,144, "Cellular Telephone Location System", and U.S. Pat. No. 6,047,192, "Robust Efficient Localization System") can provide the fast control channel location and mid-call location capabilities required. The wireless location system is triggered by the Link Monitoring System (see U.S. application Ser. No. 11/198,996, "Geo-fencing in a wireless location system," and U.S. Pat. No. 6,119,000, "Method and apparatus for tracking identity-code changes in a communications system") available as modifications to the Agilent Access7 operations support system (OSS). Note that capabilities of the LMS may also be built into wireless communications network equipment. FIG. 7 illustrates the LMS monitoring of links in a GSM and UMTS dual mode network.

For Mobile Originated Voice Calls and SMS

All MO and MO-SMS event initiations that occur in the Area of Interest will be located with low accuracy location technology. If this location estimate indicates that it is potentially in the quiet zone(s), the setup of the call is held up while a high accuracy location is performed. If it is not potentially in the quiet zone(s) then the subscriber is located periodically, i.e. mid-call locations, to determine whether they enter the quiet zone while on a call. If they enter a quiet zone while on a call then the call is terminated.

For Mobile-Terminated Voice Calls and SMS

All MT voice and MT-SMS event initiations that occur in the Area of Interest will be located with low accuracy technology. If this location estimate indicates that it is potentially in the quiet zone(s), then the setup of the call is held up while a high accuracy location is performed. If it is not potentially in the quiet zone(s), then the call is allowed to go through to the mobile and the subscriber is located periodically, i.e. mid-call locations, to determine whether they enter the quiet zone while on the call. If they enter a quiet zone while on a call, the call is terminated.

Periodic Registration—Idle Mode

If periodic registration is enabled for the network or the Area of Interest (s); all idle mobiles present in the Area of Interest and periodically register will be located with low accuracy technology. If this location estimate indicates that it is potentially in the quiet zone(s), then a high accuracy location is performed. If the High accuracy location indicates that it is in the quiet zone, then the Controller (for example, the SCP 801 (FIG. 8) or gsmSCF 1001 (FIG. 10)) will initiate call handling via the intelligent network that has the wireless communications network to indicate that for incoming calls, SMS, or data sessions; the mobile device is not available, i.e. go to voice mail or return a cannot reach, out-of-service indication.

If periodic registration is not enabled for the network or the Area of Interest (s), all idle mobiles that are in the Area of Interest can be periodically polled via null-SMS messaging or the CAMEL 3/4 AnyTimeInterrogation (ATI) Procedure. When polled the idle mobile(s) will be located with low accuracy technology. If this location estimate indicates that it is potentially in the quiet zone(s), then a high accuracy location is performed. If the high accuracy location indicates that it is in the quiet zone, then the Controller will initiate call handling via the intelligent network that has the wireless communications network to indicate that for incoming calls, SMS, or data sessions; the mobile device is not available, i.e. go to voice mail or return a cannot reach, out-of-service indication.

For Mid-Call Denial of Voice Calls

If a mobile device is on-call when entering the Area of Interest, a high-accuracy location will be performed and the mobile's identification checked. If the mobile device is blacklisted, the call will be disconnected. If the mobile device is grey listed, the mobile may be added to a prioritized queue for future periodic high-accuracy location or the call or data session may be ended. If the mobile device is white listed, no denial of service or future location will be scheduled.

If a mobile device is on-call when entering the Area of Ambiguity (that is, when the mobile station is deemed to have potentially entered the Quiet Zone), a high-accuracy location will be performed and the mobile's identification checked. If the mobile device is blacklisted, the call will be disconnected. If the mobile device is grey listed, the mobile may be added to a prioritized queue for future periodic high-accuracy location, denied future service or have the current call or data session ended. If the mobile device is white listed, no denial of service or future location will be scheduled.

The priority level assigned to the mobile may be set according to operator input, the entry point into the Area of Interest (such as distance from the area of interest within the Area of Interest or at a location associated with a roadway or gate), or velocity (such as speed and heading toward the area of interest within the Area of Interest). The speed, heading, and proximity may be used in accordance with the present invention for prioritization of scarce high-accuracy resources. If the mobile device is generally heading toward the quiet zone, the system can upgrade the location technology to a higher accuracy and increase the mid-call location rate. In GSM, one may start with CGI, move to CGI+TA and then ECID before U-TDOA. Fast movers heading toward the Quiet Zone could immediately get switched to U-TDOA, preventing incursion into the Quiet Zone. Other facets of speed, heading and proximity may include the allocation of spare U-TDOA cycles, or the downgrading of priority if the mobile device is following an allowed behavior (e.g., fast mover located on a road that passes through the area-of-interest).

In CAMEL Phase 4, the CGI-based Service Area Identifier was introduced. The SAI is used to identify an area consisting of one or more cells belonging to the same LA (Location Area). Such an area is called a Service Area and can be used for indicating the location of a UE (User Equipment) to the CN (Core Network). The SAC (Service Area Code) together with the PLMN-Id (Public Land Mobile Network Identifier) and the LAC (Location Area Code) will constitute the Service Area Identifier. SAI=PLMN-Id+LAC+SAC. The SAI can be used to identify areas down to a single cell and may be used in the present invention for identifying cells overlaying, surrounding, or in proximity to the Quiet Zone allowing for CAMEL triggering based on these areas.

CAMEL Interaction

Wireless intelligent networking (in this example, the CAMEL system for GSM and UMTS Radio access networks) operation requires triggers (CSI—CAMEL Subscription Information) to be included as part of a mobile subscriber's subscription information in the HLR. These triggers will be forwarded to the appropriate VLR when the mobile attaches and moves around the network. There are two basic types of CSI; these are O-CSI (Originating—CAMEL Subscription Information) and T-CSI (Terminating—CAMEL Subscription Information). The early phases of CAMEL (1&2) supported voice support, later phases of CAMEL (3, 4, X) include many variations of CSI including those necessary to implement the inventive concept for GPRS (GPRS-CSI) and SMS (OSMS-CSI and TSMS-CSI).

In illustrative embodiments of the present invention, a default set of triggers will be provisioned on the serving MSC with coverage over the Quiet Zone. In some cases (mobile-terminated calls where the serving MSC is not the Gateway MSC), the default trigger set will have to provisioned and implemented on the Gateway MSC. HLR generated triggers will become the secondary set of triggers and implemented only if allowed by the present invention.

Voice Calls

Mobile Originating Call Case

If an active originating CAMEL Subscription Information (CSI) is found in the VLR during the call set up of a MS, the Visited (serving) Service Switching Function (VSSF) (the MSC) sends an InitialDetectionPoint message to the gsmSCF (SCP) and the VMSC suspends the call processing. The InitialDetectionPoint shall always contain the service key, called and calling party number, calling party's category, location number, bearer capability, event type Basic Call State Model (BCSM), location information and the International Mobile Station Identity (IMSI).

Mobile Terminated Call Case

In the case of mobile terminating call, the Gateway MSC (GMSC) in the interrogating PLMN identifies the HLR of the called party with the help of the MSISDN. Then the GMSC sends a RoutingInformation-Request to the HLR. The HLR checks the CSI of the called party and sends the information stored in the subscriber record back to the GMSC. Now, the GMSC acts according to CSI. If the terminating CSI is active the trigger criteria of a Detection Point (DP) is fulfilled and the call processing is suspended. An InitialDP message, which shall always contain the service key, called party number, event type BCSM and the IMSI is sent to the SCP and the service logic execution is started. Thereafter CAMEL specific handling is initiated.

Please note for the present invention, either the Gateway MSC should be the serving MSC or the Gateway MSC should be provisioned with the correct triggers for the subscriber selective, area-based service denial system to function for Mobile-Terminated voice calls and in some cases or in some vendor specific implementations, mobile-terminated SMS messaging.

SMS

SMS References for GSM are 3GPP TS 03.40 Technical Realization of Short Message Service Point-to-Point; and 3GPP TS 23.040 Technical realization of Short Message Service (SMS) and CAMEL 3GPP TS 22.078.

SMS-Origination

The SMS-Origination can be blocked at the MSC/VLR in the same manner as an MO call using the OSMS-CSI trigger. Please note that this functionality requires a CAMEL Phase 3 compliant system (MSC/VLR, SCP, HLR)

SMS-Termination

The SMS-Termination can be blocked at the MSC/VLR in the same manner as an MO call using the TSMS-CSI trigger. Please note that this functionality requires a CAMEL Phase 3 compliant system (MSC/VLR, SCP, HLR).

GPRS

The General Radio Packet Service (GPRS) control via CAMEL was enabled in CAMEL Phase III. The merging of the mobile intelligent network with GPRS enables the SCP to exercise control over the GPRS services as well as over such operations of GPRS as connection, cancellation, etc. in addition to monitoring the links and implementing GPRS accounting. FIG. 12 shows the interconnection of the SCP to the SGSN for CAMEL phase III and the present invention.

The GPRS CSI contains the necessary information for functioning of the present invention. The GPRS-CSI contains following information, gsmSCF (SCP) Address, the Service Key, the Default GPRS Handling, TDP List (Trigger Detection Point List), CAMEL Capability Handling, CSI state, Notification flag, and the gsmSCF address list for CSI.

gsmSCF Address—this is the identity of the CSE (CAMEL Service Environment) to be used for service interaction, i.e. the gsmSCF or SCP. It is made up of a global address enabling visited networks to identify the gsmSCF and route signalling accordingly.

Service Key—the CSI also contains information related to the OSS of the subscriber and is termed the Service Key. This is used to identify the service logic to be used by the gsmSCF. It is administered by the HPLMN and is passed transparently by the VPLMN/IPLMN to the gsmSCF.

Default Call Handling—this indicates whether the call shall be released or continued when there is an error in the dialogue between the gprsSSF (SGSN) and gsmSCF. An example of this maybe when the requests from the gprsSSF are not acknowledged by the gsmSCF, despite repeated retransmissions. Each Service Key has a default call handling setting associated with it.

TDP (Trigger Detection Point) List—this indicates at which detection point CAMEL triggering will take place.

FIG. 1

Figure 1:
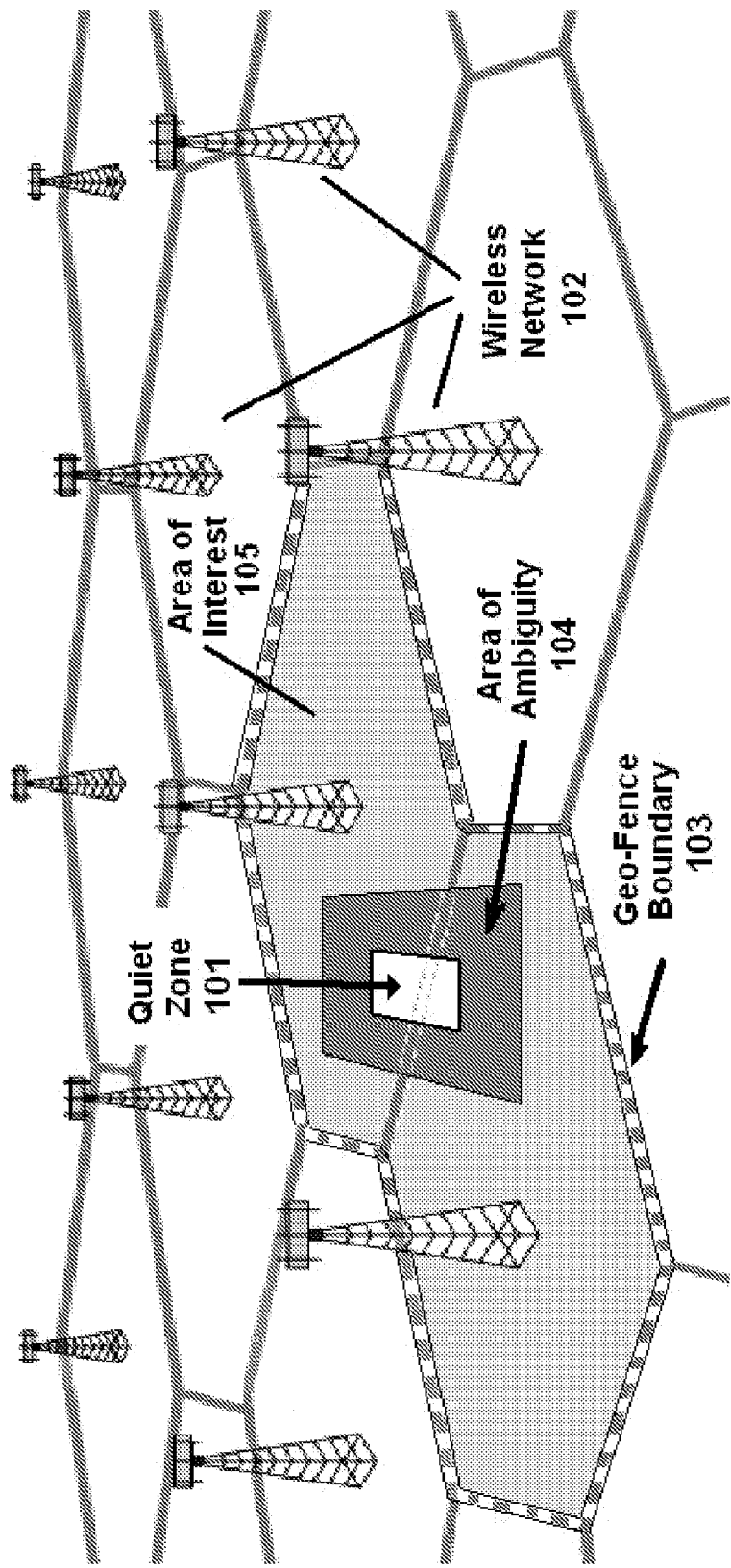
FIG. 1 schematically depicts the present geo-fencing concept and terminology.

FIG. 1 illustrates an example in which an embodiment of the present invention is deployed in a wireless, cellular network 102. The Quiet Zone (QZ) 101 is the geographic area where call control is desired. The QZ 101 can be sized or shaped to any arbitrary degree. The QZ 101 can include a portion of a cell, a portion of a sector, or include multiple sectors and/or multiple cells. The QZ 101 can span multiple wireless communications networks 102 with coverage over the geographic QZ 101 area or multiple MSC coverage areas with the QZ 101 segmenting into sub-zones for each MSC. In effect the QZ 101 can be independently constructed for each network and/or coverage MSC without the need to communicate or coordinate between networks or coverage MSCs.

The Area of Ambiguity 104 represents the geographic area where call control is exerted to overcome the accuracy limitations of the wireless location technology used. An Area of Ambiguity 104 polygon is constructed by (or for) each wireless operator network with coverage over Quiet Zone 101. The Area of Ambiguity 104 shape and area is based on the predicted or measured location uncertainty around the Quiet Zone 101. The Area of Ambiguity 104 can be created in real time for each location technology and location calculation. The Area of Ambiguity 104 was created to minimize the affect implementing the Selective Area-based Service Denial service to the minimum possible area and the minimum number of mobile devices. The geo-fence boundary 103 is constructed by setting the paging or service area in the cellular network 102. Use of mobile device behavior and WCN parameters and settings was introduced in U.S. application Ser. No. 11/198,996 entitled "Geo-fencing in a Wireless Location System." It should be noted that the Area of Ambiguity may be determined by the accuracy of the wireless location system. It forms a border around the Quiet Zone, and can be static, determined from test calls and/or predictive modeling, or dynamic, with the error estimate for each location attempt examined to see if the mobile device could possibly be in the Quiet Zone. The Quiet Zone is a geographically determined area, and is determined first. The Area of Interest is determined second by the radio footprint overlaying the Quiet Zone.

The Area of Interest (AoI) 105 is the geographic area where passive monitoring of radio events is enabled. The AoI 105 is a polygon, shaped by the antenna radiation patterns of the WCS (cells and/or sectors) and the broadcast settings of the WCS that form the Geo-fence Boundary 103. Any mobile device passing into the AoI 105 will either perform a registration if idle or a handoff if active. Mobile devices that enter the AoI 105 while powered down will perform a registration before becoming active. The AoI 105 is sized so that mobile devices within the Area of Ambiguity 104 cannot use antenna from outside the AoA for communications.

Figure 2A:
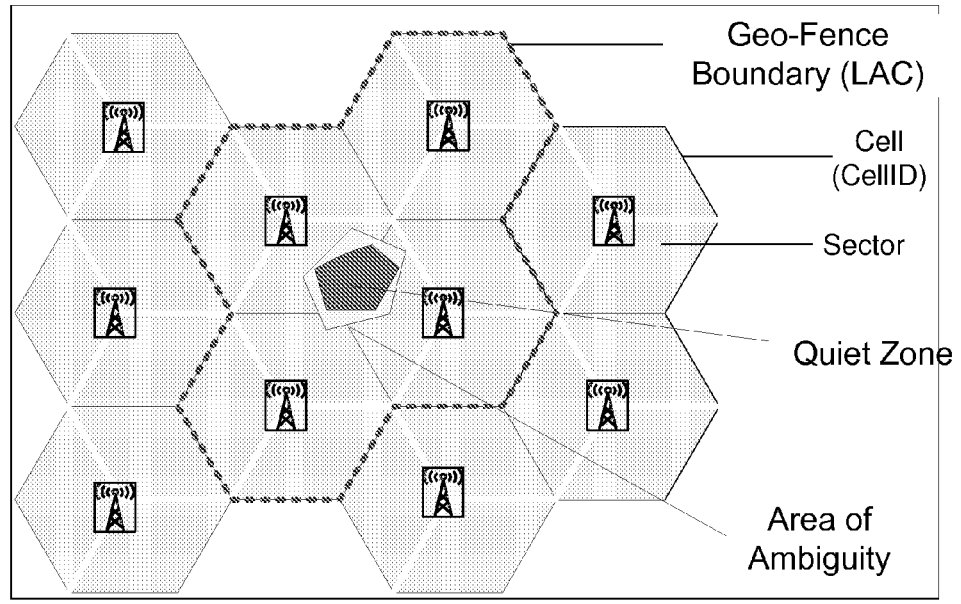
FIG. 2a schematically depicts the present geo-fencing concept where the geo-fenced area overlays parts of multiple cell-sectors.
Figure 2B:
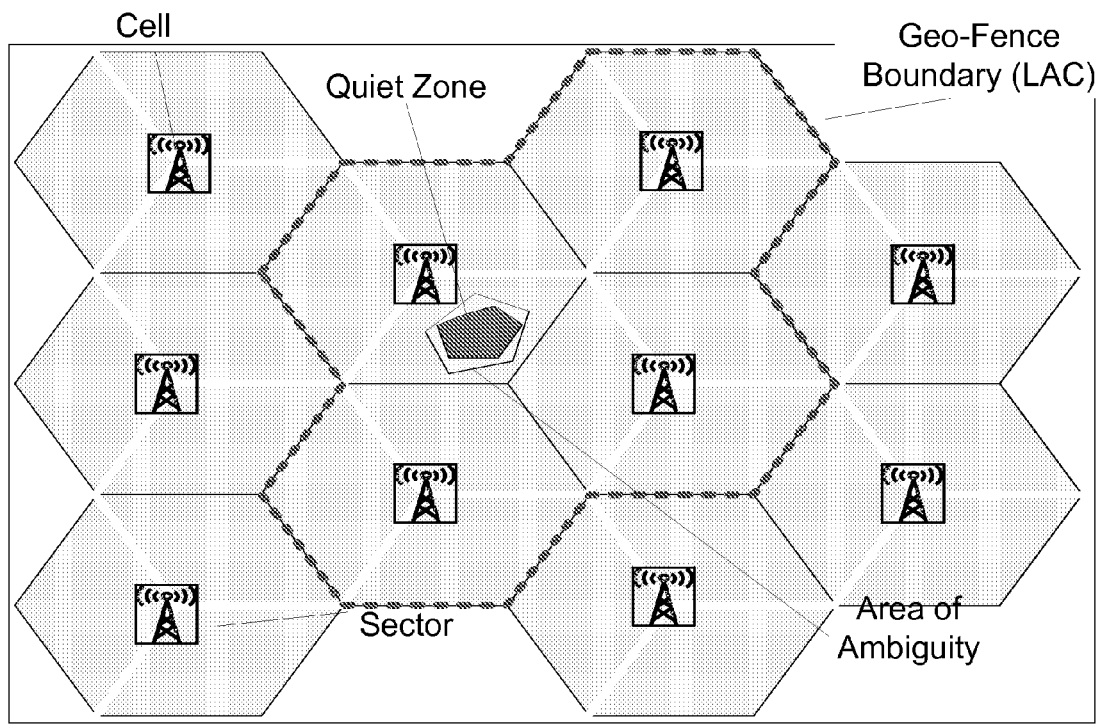
FIG. 2b schematically depicts the present geo-fencing concept where the geo-fenced area is smaller than a cell and sector.
Figure 2C:
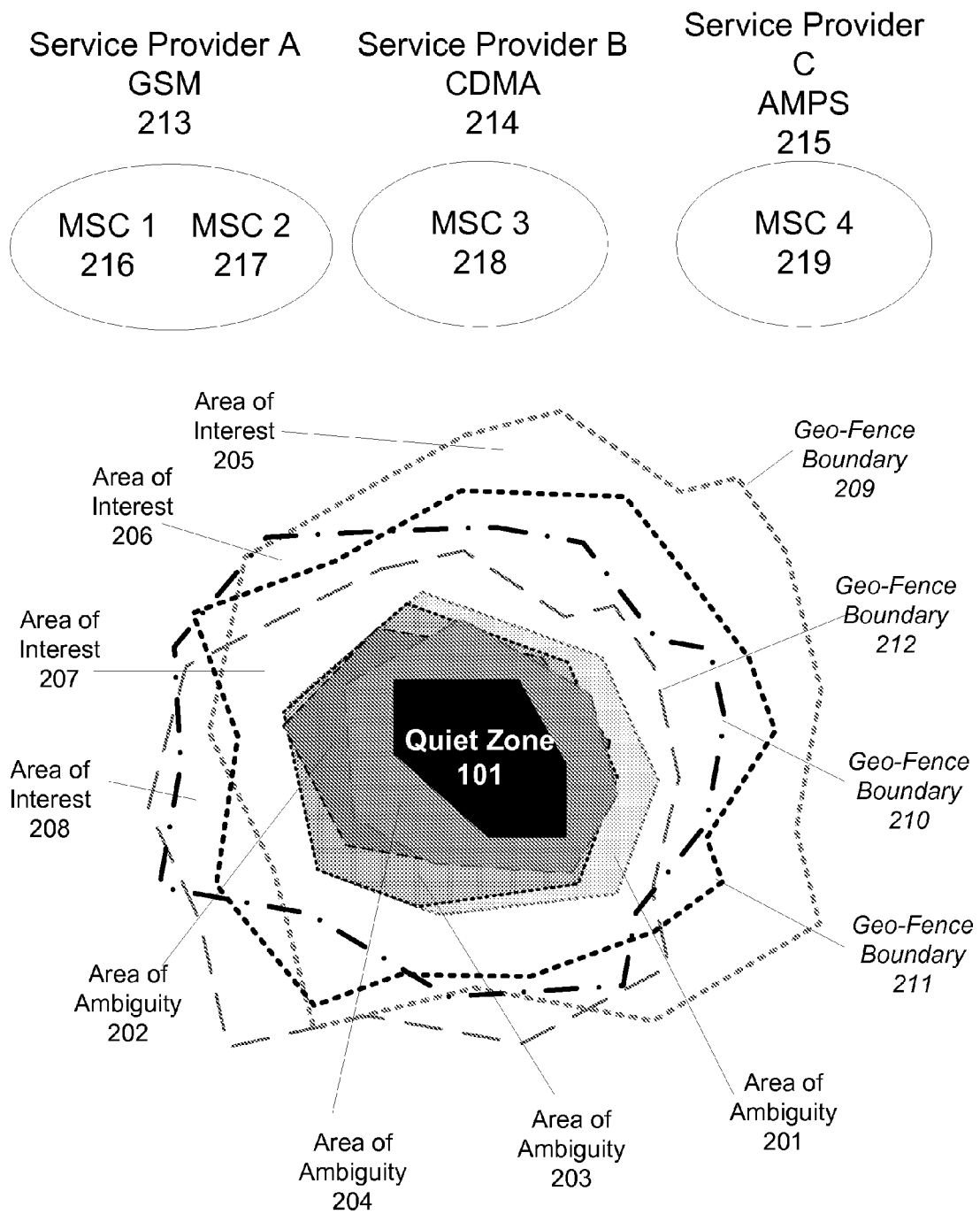
FIG. 2c schematically depicts a quiet zone, area of ambiguity and the area of interest where the quiet zone area is deployed within multiple Wireless Communications Networks with different air interface (radio access) technologies with coverage over the quiet zone.

FIGS. 2a, 2b, 2c

FIG. 2a is used to schematically depict the quiet zone 101, the area-of ambiguity 104 and the area of interest 105 deployed where the Quiet Zone 101 area extends over multiple cells and sectors of a Wireless Communications Network 102.

FIG. 2b is used to schematically depict the quiet zone 101, the area-of ambiguity 104 and the area of interest 105 deployed where the Quiet Zone 101 area deployed within a single sector of a Wireless Communications Network.

FIG. 2c is used to schematically depict the quiet zone 101, the area-of ambiguity 104 and the area of interest 105 deployed where the Quiet Zone 101 area is deployed within multiple Wireless Communications Networks with different air interface (radio access) technologies with coverage over the Quiet Zone 101 area. While there is only a single Quiet Zone 101 in this example, the Areas-of-Ambiguity 201, 202, 203, 204 exists for each Wireless Communications Network 213 214 215, each potential serving MSC 216 217 218 219 and for each location technology available. Similarly, the Areas-of-Interest 205, 206, 207, 208 and the defining geo-fence boundaries 209 210 211 212 are apportioned to and are therefore unique to each Wireless Communications Network 213 214 215 and each potential serving MSC 216 217 218 219.

Restating this, Wireless Communications Network "A" 213 has two potentially serving MSCs 216 and 217 whose coverage area includes the Quiet Zone 101. Each of the WCN A MSCs 216 and 217 has a distinct Area of Interest 205, 206 formed by the geo-fence boundaries 209 and 210, respectively, and a unique Area of Ambiguity 201, 202. Wireless Communications Network "B" 214 has a single serving MSC 218 whose coverage area includes the Quiet Zone 101. The WCN "B" 214 serving MSC 218 has a distinct Area of Interest 207 formed by a geo-fence boundary 211 and a unique Area of Ambiguity 203 based on the location technology used. Wireless Communications Network "C" 215 has a single serving MSC 219 whose coverage area includes the Quiet Zone 101. The WCN "C" 215 serving MSC 219 has a distinct Area of Interest 208 formed by geo-fence boundary 212 and a unique Area of Ambiguity 204 based on the location technology used in WCN C 212.

Figure 3:
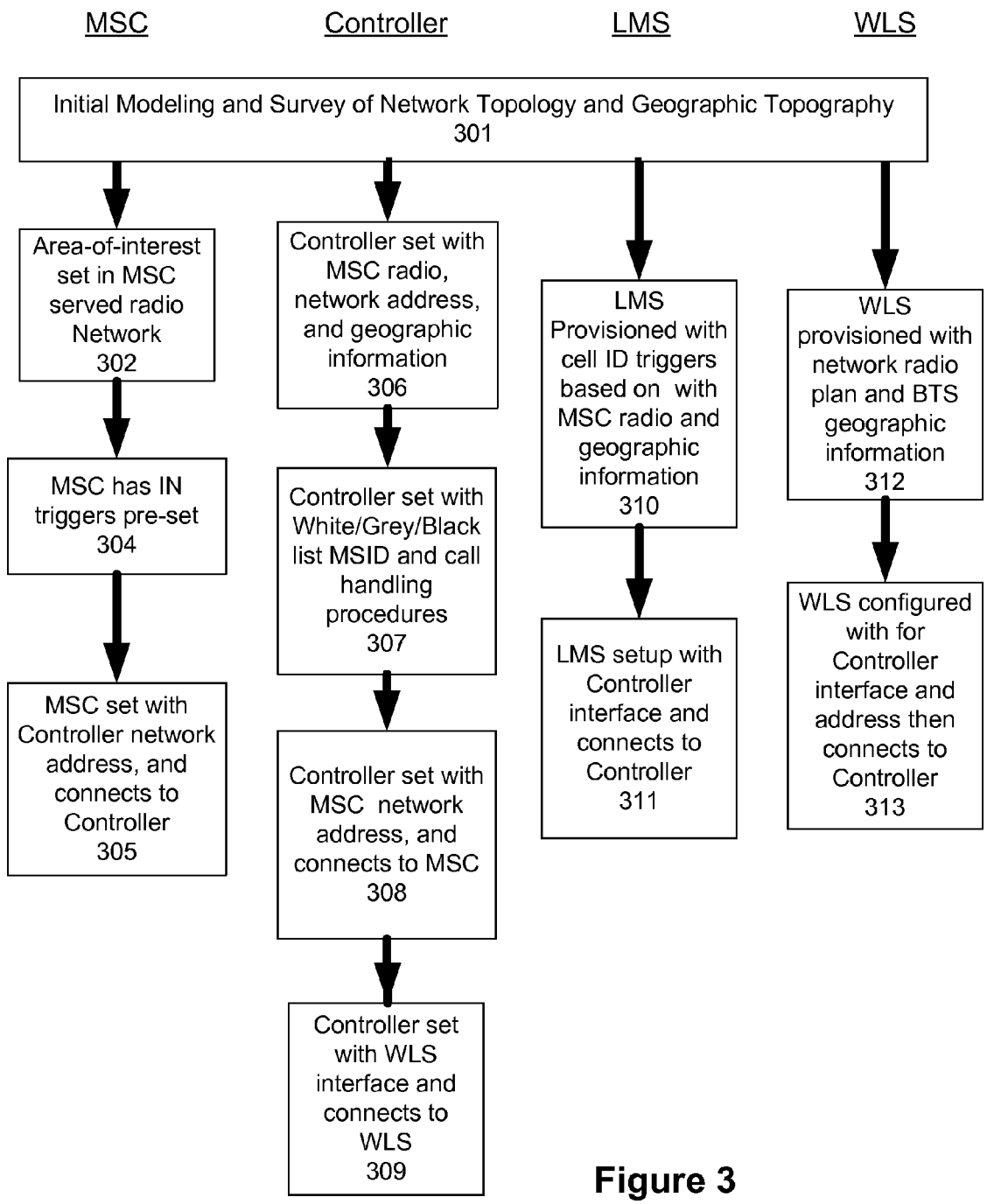
FIG. 3 illustrates a procedure for provisioning a quiet zone in accordance with an aspect of the present invention.

FIG. 3—Provisioning

FIG. 3 depicts the provisioning process that may be followed in accordance with the present invention using the widely deployed Groupe Special Mobile (GSM) radio access network and the Customised Application for Mobile network Enhanced Logic (CAMEL) intelligent network typically used with the GSM radio access network as illustrative examples. Both the GSM system and the CAMEL network are standardized by the European Telecommunications Standards Institute (ETSI) and the 3rd Generation Partnership Project (3GPP).

The first stage of the provisioning process (shown in FIG. 3) involves either modeling and/or surveying of the quiet zone and determination of the geographic area of interest and then translating these geographic coordinates to radio system parameters such as cell and sector IDs (CGI) and Timing advance bands. Determination of the area-of-ambiguity is carried out in real time based on the precision of the available location technology and the accuracy of the specific location fix performed.

Once the network and geographic mapping is complete, the creation of a paging area (a Location Area in GSM) to match the area-of-interest is performed at the MSC and subsequently at each affected BTS. If the Area-of-interest spans multiple MSC areas, then multiple MSCs will repeat the paging area instantiation.

The MSC(s) will have Intelligent Network (in the GSM examples, these triggers will be CSI or CAMEL Subscription Information) triggers set. Depending on the capabilities of the MSC, MSC vendor preferences or Wireless Network Provider (WNP) settings, additional modifications to the MSC application software or interfaces options may be required to deliver the requisite IN functionality.

During this same pre-service provisioning period, the Controller will be provisioned with the information gleaned from the network and geographic mapping so that the area-of-interest and all parameters match those used in provisioning the MSC(s). The Controller will be provisioned to reside in the Signaling System 7 (SS7) network and granted originating and terminating point codes (OPC and DPC) so that communications with the MSC(s) are possible.

Either during the pre-service provisioning period or during the run-time operation of the selective area-based call denial system, the controller-based database may be populated with mobile device identifiers (in GSM, these would be the Mobile Subscriber Integrated Services Digital Network Number (MS-ISDN), the International Mobile Subscriber Identity (IMSI) or the International Mobile Equipment Identity (IMEI)). Please note that the Controller may have access to the HLR of the mobile-of-interest, or the LMS may be monitoring the landside network (in the GSM example, this would be the GSM-MAP network) and thus the permanent subscriber identifications may be translated (in the GSM example, the MS-ISDN can be used to request the IMSI from the HLR) or discovered via the LMS.

During the pre-service provisioning period, the LMS will be deployed and provisioned with the information derived from the network and geographic mapping so that the cell-ID/sectors (for GSM, the CGI) within the area-of-interest are placed as LMS triggers. Henceforth the LMS will collect and report on events such as Mobile Termination, SMS Termination, Mobile Origination and SMS Origination within the area-of-interest.

The TDOA or TDOA/AoA WLS will be installed, calibrated and optimized in the pre-service provisioning period if not already installed for other Location-based-services (LBS) purposes. The tasking interface between the controller and the WLS (the ATIS standardized Lbis interface in this example) will be provisioned at this time.

Figure 4A:
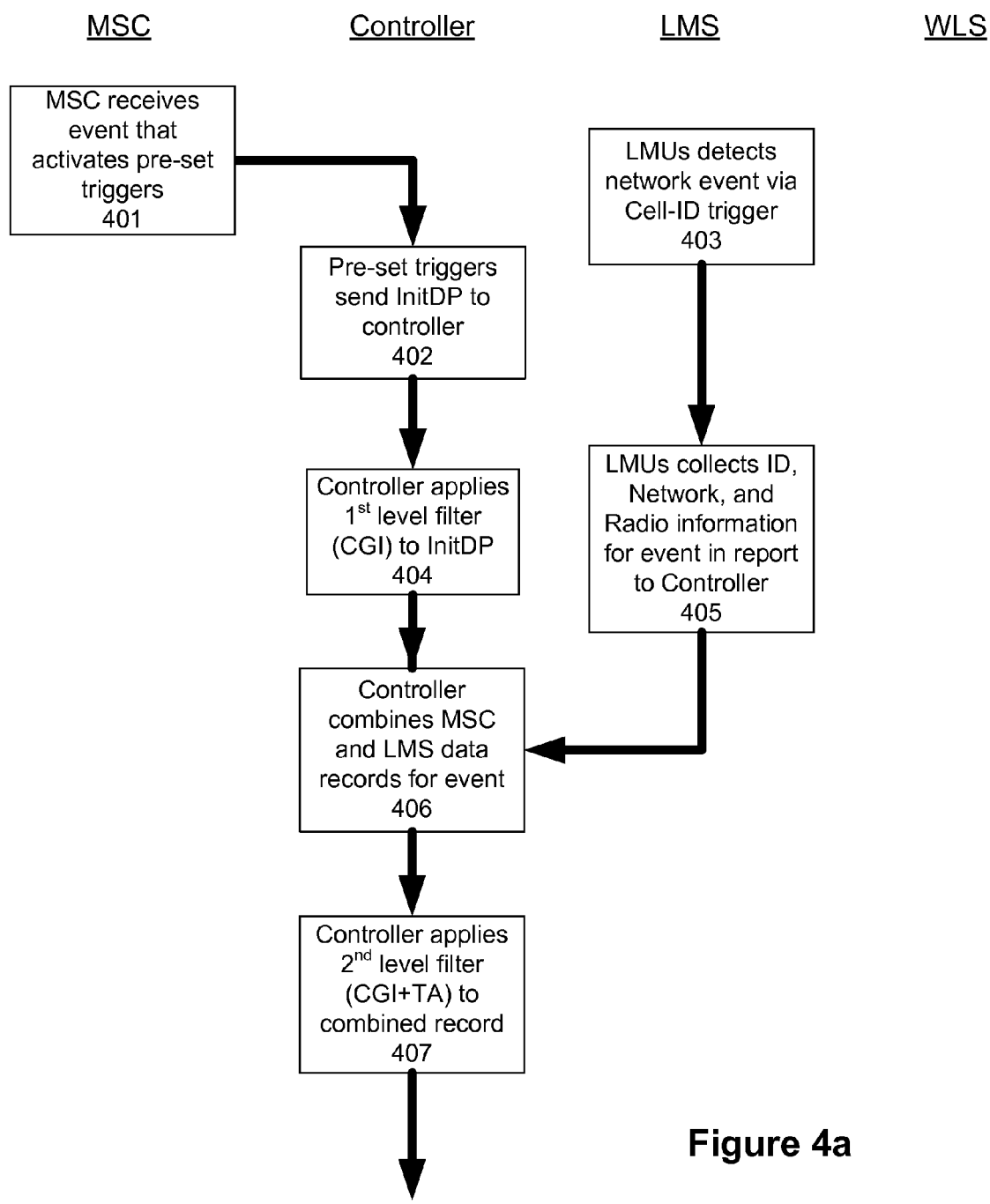
FIGS. 4a and 4b illustrate steps for denial of service at session initiation.
Figure 4B:
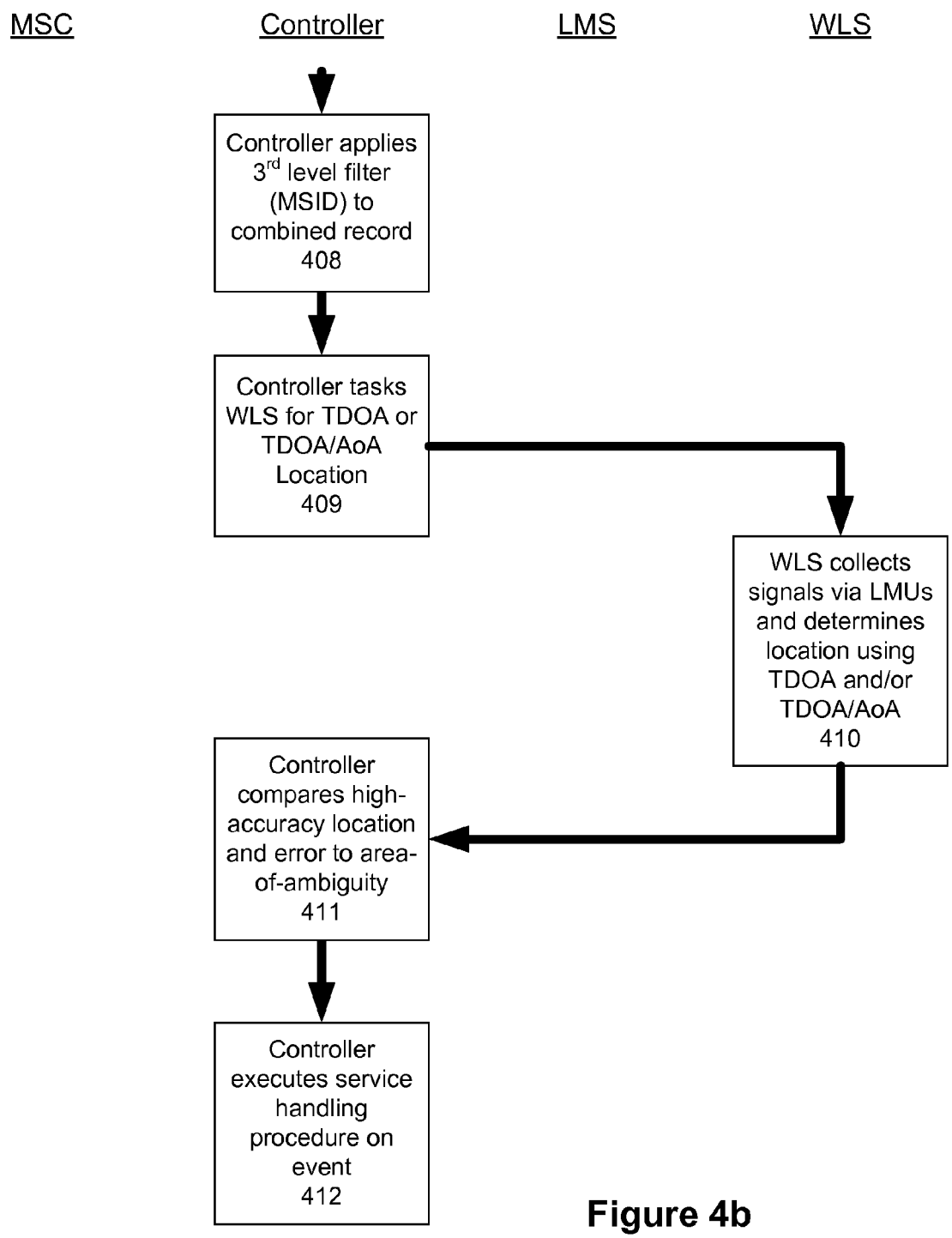

FIGS. 4a and 4b—Parallel Detection, Serial Processing

FIGS. 4a and 4b depicts the process followed by the present invention using the widely deployed Groupe Special Mobile (GSM) radio access network and the Customised Application for Mobile network Enhanced Logic (CAMEL) intelligent network typically used with the GSM radio access network as illustrative examples. Specially, the method described in FIGS. 4a and 4b are for denial of voice or data service at service intuition.

The run-time operation of the present invention starts with the parallel detection of a triggering event by the serving MSC and the deployed LMS. In the MSC, this triggering event will (as is normal for IN triggering events) cause the MSC to suspend processing and signal to the Controller using the IN (CAMEL in the GSM example) facilities or a facility analogue to the IN system.

The controller, upon receiving the triggering message (in CAMEL this message is termed an Initial Decision Point or Init DP) analyses the Init DP message contents to determine if the triggering event is within the Area of Interest (AOI). This first filter is based on Cell ID or cell/sector ID (in the GSM example, the Cell Global Identity (CGI) corresponds to either). If the controller finds a match, then the call is presumed to be within the AOI and is subject to further analysis. Otherwise, if this first filter stage fails to find a match within the AOI cell/sector list, then the Controller concludes the IN session with a reply (in the GSM/CAMEL example this reply would be a Continue message along with a RequestReportBCSMEvent (RRB) message to the MSC through the CZC Signaling System. The CZC will request for the Answer and Disconnect events at a minimum, within the RRB message. It could also request for other events like No_Answer, Busy, Abandon, etc. The reply messaging will cause the MSC to proceed with call processing but also set additional decision points and implement the call state machine or call model, allowing the Controller to send future signaling to control this call or data session.

For all triggering messages that fail to pass the first line filter, the LMS generated report for the active mobile device is mated to the MSC produced IN trigger using the mobile identity possibly with the serving cell or cell/sector ID. The produced call record is then analyzed by the Controller using the range information provided by the LMS. This range information can be derived from the Timing Advance (TA) for the illustrative GSM/CAMEL system, and could be Serving-one-way-delay for CDMA/ANSI-41 systems or Round-Trip-Time (RTT) for UMTS systems. Power level examination using the mobile RSSI is another range determination method that may be used by $2^{nd}$ line filter. Both the timing and power level derived range data can be improved using test calls and a calibration database. If a match occurs using the second line filter (using the illustrative GSM terms this would be the CGI+TA filter), then the call record is forwarded to the $3^{rd}$ line filter. Otherwise the Controller concludes the IN session with a reply (in the GSM/CAMEL example this reply would be a Continue message along with a RequestReportBCSMEvent (RRB) message to the MSC through the CZC Signaling System. The CZC will request for the Answer and Disconnect events at a minimum, within the RRB message. It could also request for other events like No_Answer, Busy, Abandon, etc. The reply messaging will cause the MSC to proceed with call processing but also set additional decision points and implement the call state machine or call model, allowing the Controller to send future signaling to control this call or data session.

The $1^{st}$ line filter (cell/sector filter) and the $2^{nd}$ line filter (cell, sector, and range) are used to reduce the latency introduced by the Selective Area-based Service Denial system for mobile devices accessing the Wireless Communications Network from outside the quiet zone. By the time that the $3^{rd}$ line filter operates, the number of 'false positive' triggers to the Controller has been reduced. Please note that as location-based services demand expands and IN deployments become more sophisticated, the approach used in the present invention to designate potential mobile devices for service denial may become offered as upgrades to the MSC or future all-IP packet softswitches either as more selective IN or IN-like triggers or as onboard service logic resident in the switching facility. Moving service logic to the switching facility or development of specialized high speed MSC-to-SCP links to reduce service latency are both expected developments.

The $3^{rd}$ line filter is based on mobile identifier and presumes that any mobile devices permitted service have been entered into Controller's subscriber database (e.g. white listed) prior to the current network event. The call record is then analyzed by the Controller for matches between the stored mobile ID and the mobile device ID in the call record. If the mobile device identity check versus the database fails, then the Controller concludes the IN session with a reply (in the GSM/CAMEL example this reply would be a Continue message along with a RequestReportBCSMEvent (RRB) message to the MSC through the CZC Signaling System. The CZC will request for the Answer and Disconnect events at a minimum, within the RRB message. It could also request for other events like No_Answer, Busy, Abandon, etc. The reply messaging will cause the MSC to proceed with call processing but also set additional decision points and implement the call state machine or call model, allowing the Controller to send future signaling to control this call or data session. If an identity match is successful, the WLS is tasked by the Controller to locate the mobile device.

Please note that if due to processing latency channel information is no longer considered reliable, the Controller has the ability to request updated radio access network information including the channel information needed to tune the U-TDOA or U-TDOA/AoA high accuracy location system.

Under direction from the Controller, the WLS performs a high accuracy location on the mobile-of-interest. Currently, the latency requirements require that a network-based, low latency location be performed. As previously described in TruePosition patents and applications, the WLS collects signals via LMUs and determines location using TDOA and/or TDOA/AoA. Other location implementations using handset based location techniques such as A-GPS, EOTD or OTDOA are possible if the low latency requirements and lack of notification to the mobile device user are allowed. Other lower accuracy network-based techniques such as enhanced Cell-ID (ECID or CGI+TA+RxLev in regards to the GSM/CAMEL illustrative example) Signal-Strength-Measurement or RF-Fingerprinting are possible if the low latency and high accuracy requirements are met. Please note that the term, high accuracy, directly affects the size of the Area-of-ambiguity. If a large Area of Ambiguity is acceptable, or if very small cells (pico-cells) are used in the Area of Interest that allow for an acceptable Area of Ambiguity based just on cell or cell/sector ID, then these systems meet the high accuracy requirement.

Once the high accuracy position, velocity, altitude, and error estimates are generated by the WLS and sent to the Controller, the Controller examines the calculated position and error versus the Quiet Zone area specification. If the mobile device is found to be outside the quiet zone, then the Controller concludes the IN session with a reply (in the GSM/CAMEL example this reply would be a Continue message along with a RequestReportBCSMEvent (RRB) message to the MSC through the CZC Signaling System. The CZC will request for the Answer and Disconnect events at a minimum, within the RRB message. It could also request for other events like No_Answer, Busy, Abandon, etc.). The reply messaging will cause the MSC to proceed with call processing but also set additional decision points and implement the call state machine or call model, allowing the Controller to send future signaling to control this call or data session. Otherwise, if the mobile was found in the Quiet Zone, the mobile device is now subject to service handling procedures.

The service handling procedures are myriad, but specific examples are illustrative. In the simplest scenario, the Controller terminates the IN session and the network transaction with a reply (in the GSM/CAMEL example this message would be called; Release Call (RC)). In another scenario, the Controller concludes the IN session and redirects the originating or terminating session with a reply (in the GSM/CAMEL example this message would be called; Connect (CON)). In the redirection scenario, the destination may be voice mail for a terminating voice call or for an originating voice call; redirection may be to an Intelligent Peripheral (IP)

or Specialized Resource Function (SRF) that generates tones, or voice responses. A third scenario involves the addition of new call legs to the voice call, allowing for lawful intercept and monitoring.

Figure 5A:
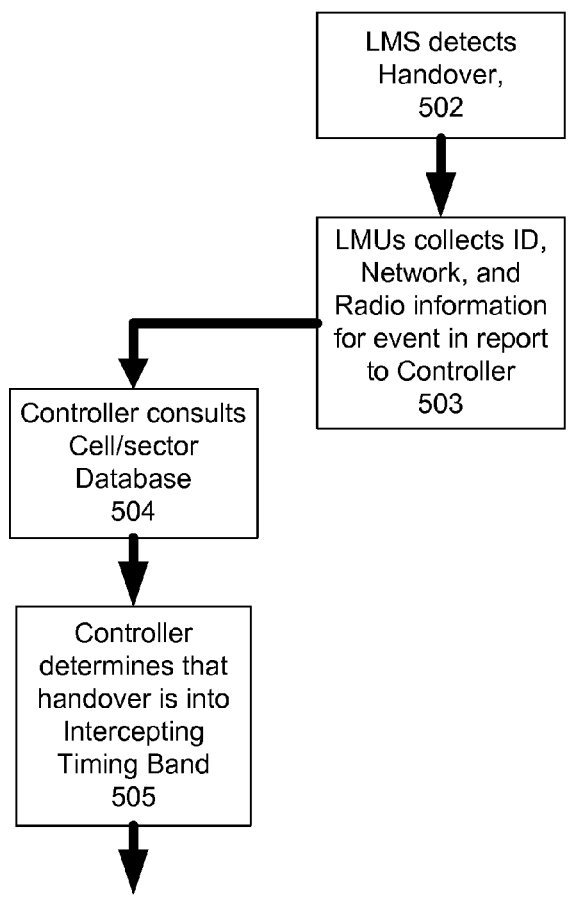
FIGS. 5a and 5b illustrate steps for denial of service mid-session.
Figure 5B:
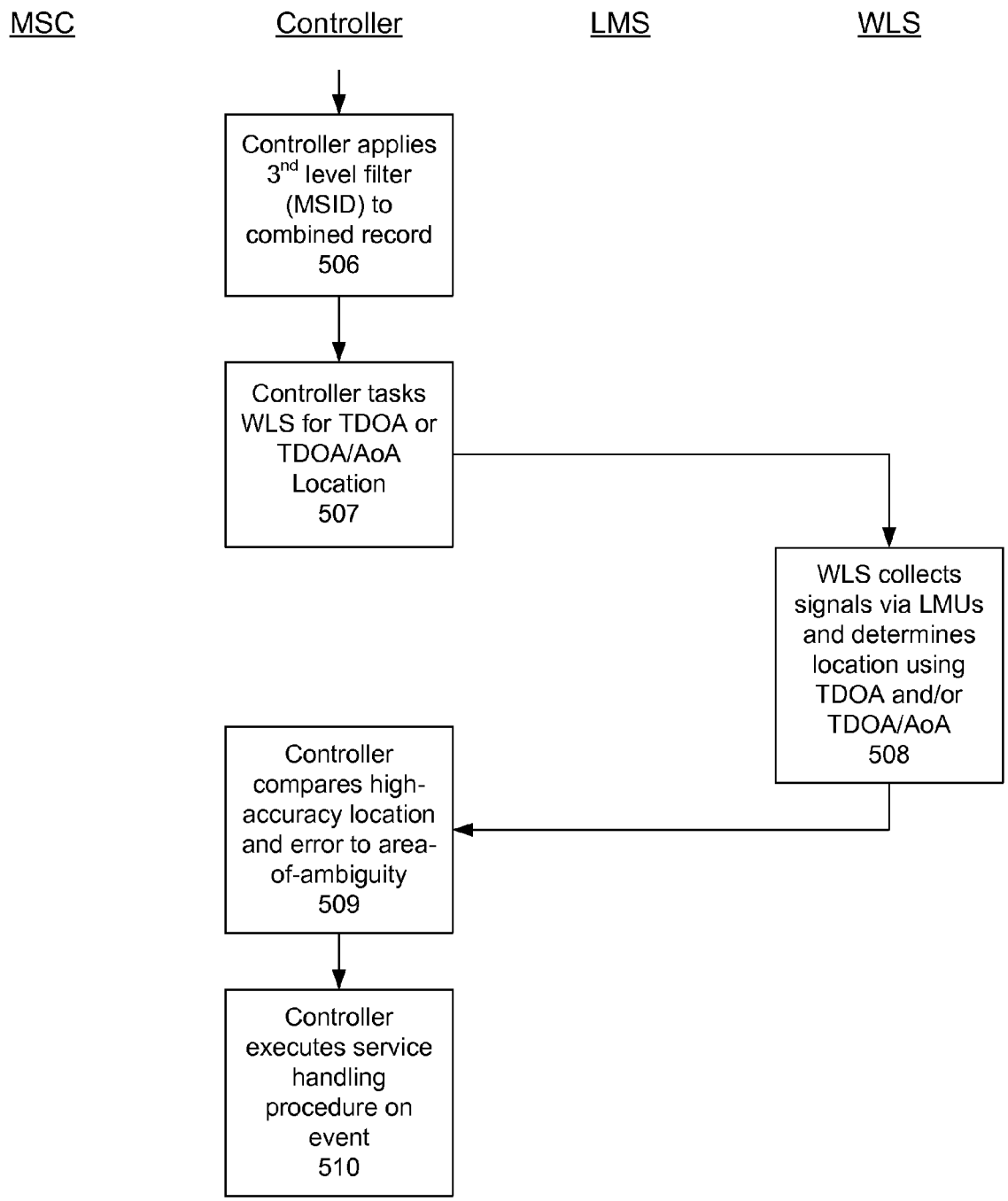

FIGS. 5a, 5b

FIGS. 5a and 5b are used to show the procedure for monitoring a mobile device allowed to access the radio network while within the Area of Interest, but initiating the communications session outside the Area of Ambiguity and thus the Quiet Zone. This monitoring allows the Controller the ability to terminate the communications session if the mobile device approaches or intrudes into the Area of Ambiguity.

Since the mobile device communications session initiated within the Area of Interest, the pre-provisioned Intelligent Network triggers (or equivalent service provided directly by the MSC of softswitch) are available via the serving MSC and the Controller has already cleared the mobile device for access. In this case, the LMS is provisioned with a set of triggers allowing for mid-call triggering of the WLS. These triggers could include measurement requests, handovers, or polled events (in GSM these would be the periodic network measurement request (NMR), handovers). Using handovers as a trigger is a particularly valuable method since handovers to a cell or sector (in GSM, a CGI) not associated with the Area of Ambiguity can be filtered out at the LMS and thus not load the rest of the system. Cells or Cell-sectors are deemed adjacent to the Quiet Zone if geographically near, but not in close contact with or providing radio coverage to the Quiet Zone. Cells or Cell-sectors are deemed associated to the Quiet Zone if providing radio coverage to the Quiet Zone.

So using the LMS, handovers are detected and associated to a previously allowed access by a previously identified mobile device to the Wireless Communications Network. If a handover is detected to a cell or sector (in GSM, a CGI) adjacent to the Quiet Zone, then the LMS will be re-tasked with a new trigger for measurement reports (in GSM, this is the Network Measurement Report (NMR)). This invention assumes that the measurement report is available and set to occur at a reasonable (a 0.5 to 6 second interval is typical) rate. Reports from this new trigger will be analyzed for cell/sector and range (in GSM, the CGI and TA values will be used where range=554(TA+1) is the range in meters).

Figure 9:
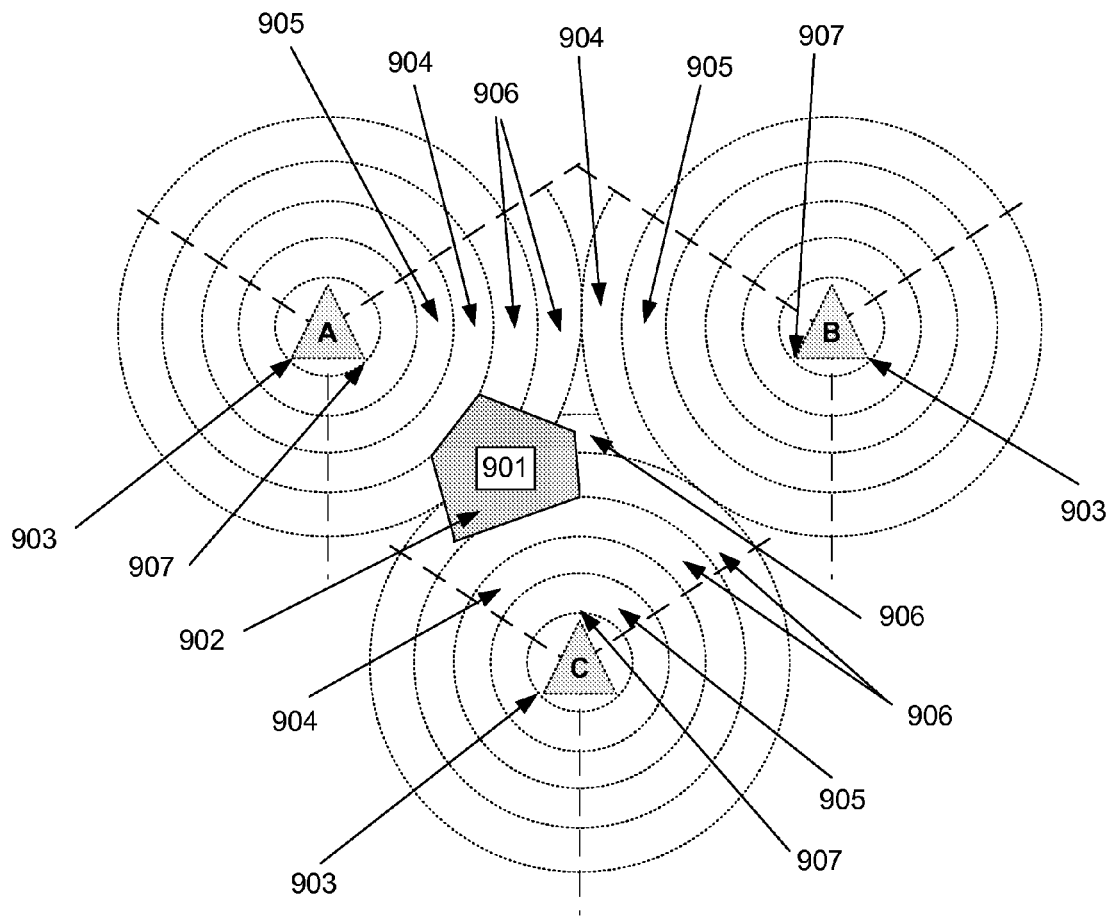
FIG. 9 is a topological depiction of the Cell ID and ranging approach to mid-call location used by embodiments of the present invention.

As shown in FIG. 9, the cell/sector and range provides a series of bands surrounding the central beacon antenna. The width of the band is dependent on the timing granularity of the timing measurement. These timing measurements are available for GSM (TA or Timing Advance), UMTS (RTT or Round Trip Time) and IS-95/IS-2000 CDMA (One-Way-Delay).

If the Controller determines from the cell/sector with ranging that the mobile device is in a "proximate" band, the LMS will continue to report the cell/sector with ranging. If the Controller determines from the cell/sector with ranging that the mobile device is in an Adjacent band, then the measurement report data collected by the LMS and reported to the Controller will be used to calculate a more precise position (in GSM this is Enhanced Cell-ID (ECID) or CGI+TA+Rx-Level). If a more precise position cannot be calculated based on the probable error or the measurement report data does not provide enough information, then the Controller will task the WLS to perform a U-TDOA or U-TDOA/AoA location using the channel data collected from the measurement report data.

If the Controller determines from the cell/sector with ranging that the mobile device is in an "Intercepting band", then the Controller will task the WLS to perform a U-TDOA or U-TDOA/AoA location using the channel data collected from the measurement report data. If the calculated position is inside the Quiet Zone (that is, the calculated location with error is within the Area of Ambiguity), then the call or data session in progress is terminated by the Controller. The Controller uses the WIN network to send a Disconnection Request (in GSM, the WIN network is the CAMEL or CAMEL Application Part (CAP) network and the CAP message is the Release Call (RC) with the cause value set to 'normal'). If the calculated position shows that the location and associated error is not within the Area of Ambiguity, then the Controller continues to monitor the cell, sector, timing, and measurement reports included in the periodic reports from the LMS. Using channel data collected by the LMS from the measurement report, the Controller via the WLS periodically refreshes the high accuracy (U-TDOA or U-TDOA/AoA) location for analysis of movement into the Area of Ambiguity.

Determination of cells, sectors and the proximate, adjacent and intercepting ranging or timing bands will be done as part of the initial system survey and will be updated within the Controller's database and shared with the LMS and WLS subsystems either periodically or on an ad hoc basis.

FIG. 6

Figure 6:
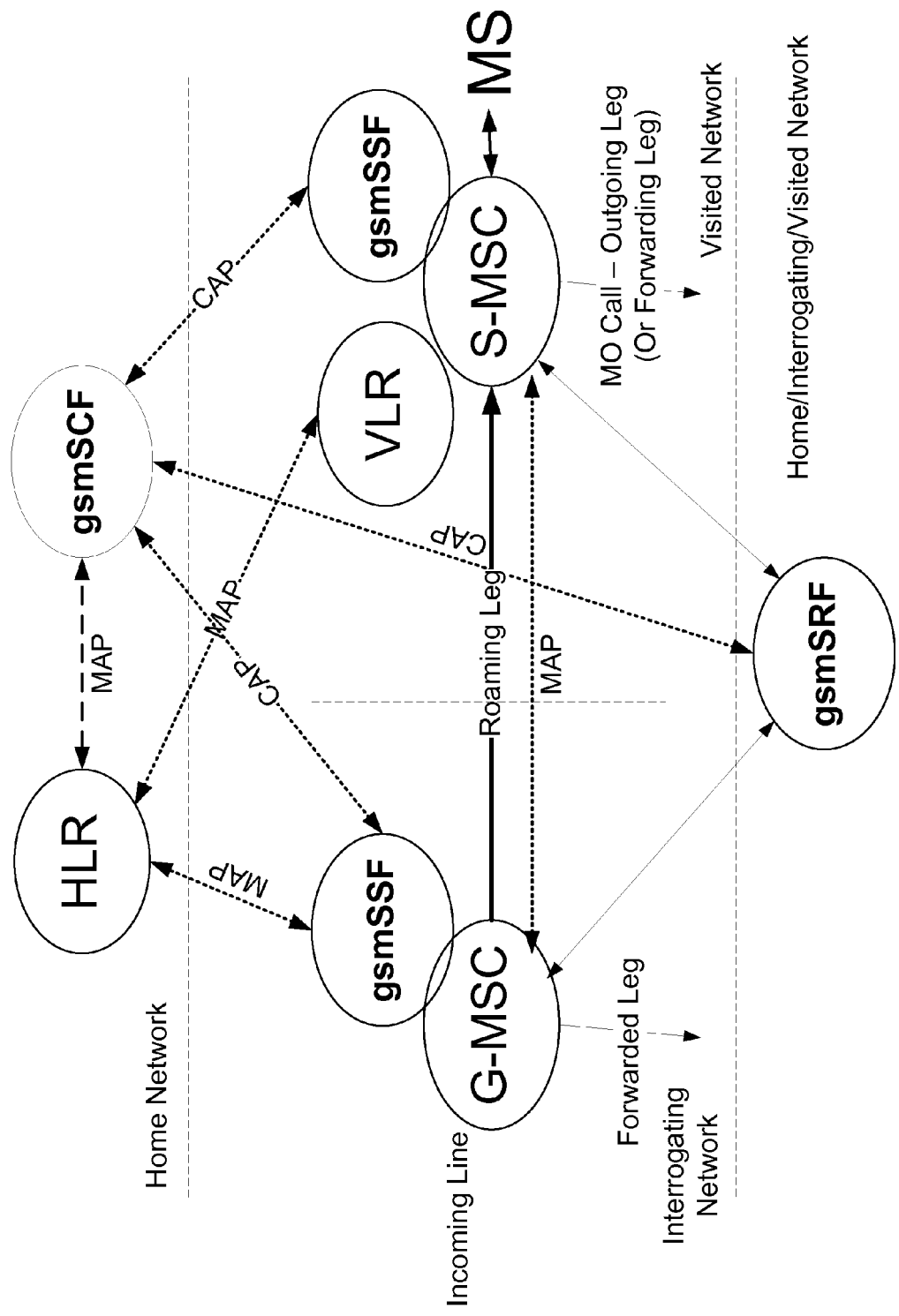
FIG. 6 schematically depicts the CAMEL wireless intelligent network interconnections and functional nodes for GSM and UMTS networks.

FIG. 6 shows the functional entities and interconnections for the CAMEL wireless intelligent network standardized for the GSM and UMTS radio interface networks.

HLR: the Home Location Register that hold the subscriber profile for CAMEL services. This set of CAMEL functions will be concatenated to a set of preemptive triggers in the present invention.

Interrogating PLMN (IPLMN): The PLMN that interrogates the Home PLMN (HPLMN) for information to handle mobile terminating call.

GSM Service Control Function (gsmSCF): functional entity that contains the CAMEL service logic to implement OSS. It interfaces with the gsmSSF, the gsmSRF, the GMLC and the HLR. The gsmSCF contains the actual independent service logic to apply to the call.

GSM Service Switching Function (gsmSSF): functional entity that interfaces the MSC or GMSC to the gsmSCF.

GSM Specialised Resource Function (gsmSRF): functional entity which provides various specialized resources. It interfaces with the gsmSCF and with the MSC. Functions of a gsmSRF include the playing of announcements.

The VLR (Visitor Location Register) is a database which stores information about all the mobiles that are currently under the jurisdiction of the MSC (Mobile Switching Center) which it serves.

Whenever an MSC detects a new MS in its network, in addition to creating a new record in the VLR, it also updates the HLR of the mobile subscriber, apprising it of the new location of that MS.

Not shown, but integral to the CAMEL network are the

CAMEL Service Environment (CSE): A CSE is a logical entity which processes activities related to Operator Specific Services (OSS).

CAMEL Subscription Information (CSI): Identifies that CAMEL support is required for the subscriber and the identities of the CSEs to be used for that support.

Basic Call State Model (BCSM): BSCM represents an abstract view of call processing, seen from the perspective of service feature control performed by the SCF. The BCSM consists of two sets of call processing logic, Originating BCSM (O-BCSM) and Terminating BCSM (T-BCSM).

Points in Call (PIC): PIC are defined by standards to represent those points in which action might be taken. They provide a view of a state or event in which call processing logic may initiate an action, such as suspension of call processing while a database is queried.

Detection Points (DP): DP represent transitional events that occur between some PICs.

Triggers: A trigger is the term used to define specific call-processing logic associated with a given point in call. Triggers are nothing more than software logic that is loaded in a network element to carry out instructions to initiate an intelligent network process based on analysis of conditions at a detection point.

Events: Unlike a trigger, which depends on some form of input criteria, an event is simply a call occurrence such as no answer, busy signal or call termination.

Arming of detection points: Detection points have two classifications: Trigger Detection Points (TDP) and Event Detection Point (EDP). A detection point is armed if control logic is established to initiate service control based on a trigger or event.

FIG. 7

FIG. 7 shows the architecture of an illustrative GERAN/UTRAN network reference model 1010 with a Radio Network Monitor (RNM) 782 and a Link Monitoring System (LMS) 711. The RNM 782 is multi-channel radio receiver, effectively a bank of narrowband receivers tunable to both the uplink and downlink channels anywhere in the frequency band. The RNM 782 was initially implemented on the TruePosition® AnyPhone™ Location Mobile Unit (LMU) radio receiver platform (the present LMU was previously described in U.S. Pat. No. 6,782,264 as the alternative narrowband embodiment of the receiver module for the SCS). The LMS is an improvement to the Abis monitor described in U.S. Pat. No. 6,782,264 able to monitor not only the Abis and A interfaces, but also the GSM-MAP, Iub, Iu-PS and Iu-CS interfaces. The LMS can be implemented, with modifications, on the same hardware/software chassis as the Abis Monitor (a set of custom applications with unmodified Agilent Access7 software application running on a cluster of Intel TSEMT2 or TSRLT2 UNIX servers)

The network 710 further includes a Serving Mobile Location Center (SMLC) 712. The RNM 782 is the primary component that can be deployed at a carrier's cell sites. The RNM 782 is preferably implemented as a distributed network of radio receivers capable of receiving RACH and SDCCH messages for autonomous generation of location services. The RNM 82 tunes to directed frequencies to gather data for the system. The RNM 782 can then forward the collected data to the SMLC 712. All RNMs 782 in a network are preferably time-and frequency-synchronized through the use of the Global Positioning Satellite (GPS) constellation (not shown).

The SMLC 712 is preferably a high volume location-processing platform. The SMLC 712 contains U-TDOA and multipath mitigation algorithms for computing location, confidence interval, speed, and direction of travel. The SMLC 712 can also determine which wireless phones to locate based upon triggering from the Link Monitoring System (LMS) 711 or requests from the Lb interface 754 to an infrastructure vendor's Base Station Controller (BSC) 796 (or MSC 750 in some cases as the Ls interface). The SMLC 712 is typically co-located at the operator's BSC 796 but can also be remotely distributed. The primary functions of the SMLC 712 are to receive reports on signal detection from the RNMs 782, to perform location processing, and to calculate the location estimate for each signal. The SMLC 712 manages the network and provides carrier access to location records. The SMLC 712 is responsible for the collection and distribution of location records. The SMLC 1712 also maintains configuration information and supports network management.

The LMS 711 continuously monitors all Abis signaling links 776 (and in some cases A-interface links 752 and GSM Mobile Application Protocol (GSM-MAP) 748 interface) in a network 710 to which the LMS 711 is connected. The function of the LMS 711 is to capture messages in the call (e.g., a GSM voice conversation, and SMS transaction or a GPRS data session) and SMS setup procedure, mid-call control messages, and call termination and release messages for MSs 780 and or UEs 788. The LMS 711 then forwards the data contained in those messages to the SMLC 712 for subsequent location processing.

The GSM service control function (gsmSCF) 720, also called a service control point (SCP), contains database and logical rules for providing non-call oriented services to a subscriber. The gsmSCF 720 connects to the MSC(s) and GSN(s) via CAMEL Application Part (CAP) 763 connections over the SS7 network 749. The GSM Mobile Application Protocol (GSM-MAP) 748 is the communications medium for call-related control services on the wired part of a wireless network. The GSM-MAP 748 exists to provide services like automatic roaming, authentication, location services inter-system hand-off, and short message service routing on a GSM or UMTS network. All wireless network elements such as the MSC 750, HLR 734, 7VLR (in the MSC 750), GMSC 744, EIR 732, GMLC 798, and gsmSCF 720 use this messaging protocol to communicate among each other. The GSM-MAP 748 resides on the international Signaling System 7 (SS7) network (the MAP-CAP network 749).

The Gateway Mobile Location Center (GMLC) 798 is defined by 3GPP standards as the clearinghouse for location records in a GSM/GPRS/UMTS network. The GMLC 798 serves as a buffer between the tightly controlled SS7 network 749 and the public internet. Authentication, access control, accounting, and authorization functions for location-based services are commonly resident on or controlled by the GMLC 798.

The Le interface 724 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 722 is also known as a LCS (Location Services). The LBS and LCS 722 are software applications and services uniquely enabled to use the location of a mobile device.

The E5+ interface 718 is a modification of the E5 interface defined in the Joint ANSI/ETSI Standard 036 for North American E9-1-1. The E5+ interface 718 connects the SMLC 12 and GMLC 98 nodes directly allowing for push operations when LMS 711 or RNM 782 triggers are used by the wireless location system with either network acquired information (cell-ID, NMR, TA, etc) or via TDOA and/or AoA (angle of arrival) performed by specialized receivers.

User equipment (UE) 788 can be defined as equipment such as a UMTS mobile device. NodeB 786 is the Universal Mobile Telephony System Radio Access Network (UTRAN) network interface to the UMTS radio interface. The Radio Network Controller (RNC) 770 enables autonomous radio resource management (RRM) by UTRAN. The RNC 770 performs the same functions as the GSM BSC, providing central control for the RNS elements (RNC and Node Bs). The RNC 770 handles protocol exchanges between Iu-PS 774, Iu-CS 762, Iur 761, and Iub 790 interfaces and is responsible for centralized operation and maintenance of the entire radio network system.

The Serving GPRS Support Node (SGSN) 768 monitors the location of individual GPRS capable Mobile Stations 780 and performs basic security functions and access control functions. The SGSN 768 can serve both the Global System for Mobility (GSM) radio access network (GERAN) and UMTS radio networks.

The Gateway GPRS Support Node (GGSN) 746 acts as a system routing gateway for the GPRS network. The GGSN 746 is a connection to external packet data networks (e.g., public internet) and performs the task of billing, routing, security firewalling, and access filtering. The Gateway MSC (GMSC) 744 acts as a bridge for roaming subscribers to visited MSCs in other operator's networks. Both control signaling and traffic trunks are setup via the GMSC 744.

The Um 715 is the GSM radio interface. The Uu 717 is the UMTS radio interface. The Iub interface 790 is located on a UMTS network and is found between the RNC (Radio Network Controller) 770 and the NodeB 786. The Iupc 772 interconnects the UMTS RNC 770 with the SMLC (also called the SAS) in the UMTS network for location estimation generation. The Iu-CS (Circuit Switched) interface 762 connects the UMTS RNC 770 with the circuit switched communications oriented network (the MSC 750). The Iu-PS (Packet Switched) interface 774 connects the UMTS RNC 770 with the packet switched communications oriented network (SGSN) 768. The Gb interface 766 interconnects the BSC 796 with the SGSN 768 allowing for routing of GPRS communications.

The Gn interface 760 is a GPRS network packet data interface which is located between the SGSN 768 and GGSN 746. The Gs interface 764 is a GPRS system interface located between the SGSN 768 and the MSC 750. The Gr (not shown) interface is a GSM-MAP interface which is located between the SGSN 768 and the Home Location Register (HLR) 734 carried on the SS7 network 749.

As described in U.S. Pat. No. 6,782,264, it is possible to monitor the base transceiver station (BTS) to base station controller (BSC) link (e.g., the Abis link) for triggering messages and information fields. A passive network monitor, called the AMS (Abis Monitoring System) in the '264 patent and exemplified by monitoring the GSM Abis interface, has been extended in accordance with the present invention and is now called the Link Monitoring System, or LMS. The Link Monitoring System (LMS) 711 can monitor multiple cellular network data links simultaneously, scanning for data of interest, and can detect particular messages or data fields within messages. Setting or tasking of messages or data fields of interest can take place at any time. When a match occurs, the LMS 711 may be further triggered to perform a pre-set action, such as a write to storage memory or forwarding of the triggering message and (or) data fields to another system node.

The Radio Network Monitor 782 extends the concept of passive monitoring for location triggering information and messaging to the radio air interface. The RNM 782 can detect and monitor both uplink (mobile device to BTS or NodeB) and downlink radio communications.

Figure 8:
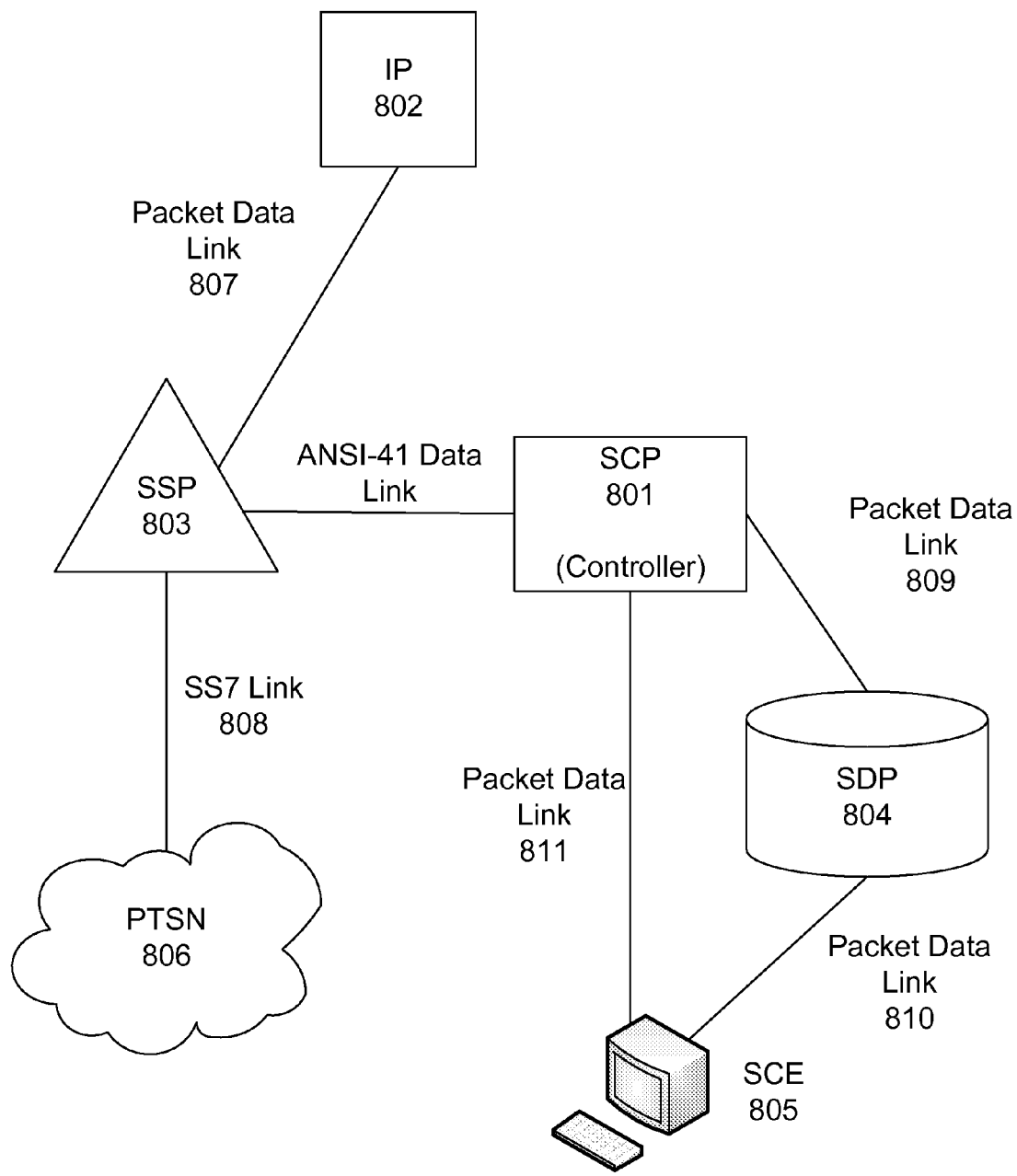
FIG. 8 schematically depicts the AIN wireless intelligent network interconnections and functional nodes for ANSI networks that include IS-95.

FIG. 8—ANSI WIN Model

FIG. 8 is used to schematically depict the network entities required for the present invention in the ANSI WIN or AIN system.

The SCP 801 or Service Control Point (SCP) corresponds to the Controller used in the present invention. The IP 802 or Intelligent Peripheral corresponds to the interactive voice exchange or tones used to (optionally) notify the caller of the service area denial. The SSP 803 or service switching point corresponds to the circuit switch or packet switched hub used to provide exchange services and host the IN triggers and call state machine with its points-in-call where actions such as hold call and disconnect may be performed. (It should be noted that the SSP 803 can be on the Serving MSC, the Gateway MSC, the Serving GPRS Support Node or the Gateway GPRS Support Node, depending on where the triggers are needed. Typically mobile-origination triggers are on the serving machine while mobile termination triggers are on the Gateway machine.) The SDP 804 or Service Data Point corresponds to the wireless location system. The SCE 805 Service Creation Environment would be used in the present invention provision the Controller with the white/grey/black list data and service logic options. The PTSN 806 or Public Telephony Switched Network is the external circuit and packet data networks. Generic Packet Data links 807, 809, 810, 811, nominally TCP/IP based, are used for inter-node transport. Standardized links include the WIN ANSI-41 Data Link between the SSP 803 and SCP 801 and the SS7 link 808 between the SSP and PTSN.

FIG. 9

FIG. 9 is a topological depiction of the Cell ID and ranging approach to mid-call location used by the present invention to monitor mobile devices granted access to initiate (originate or terminate) a communications session within the Area of Interest. Since the mobile has been granted access, the Controller already have the MSC/LMS generated records associated and can has already provisioned the LMS to follow the call via a handover trigger. In FIG. 9; 901 is the Quiet Zone, 902 is the Area of Ambiguity, 903 is a cell site within the area of interest, 904 is an adjacent timing band, 905 is a proximate, non-adjacent timing band, 906 is an intercepting timing band and 907 is a sector of a cell.

FIG. 10

Figure 10:
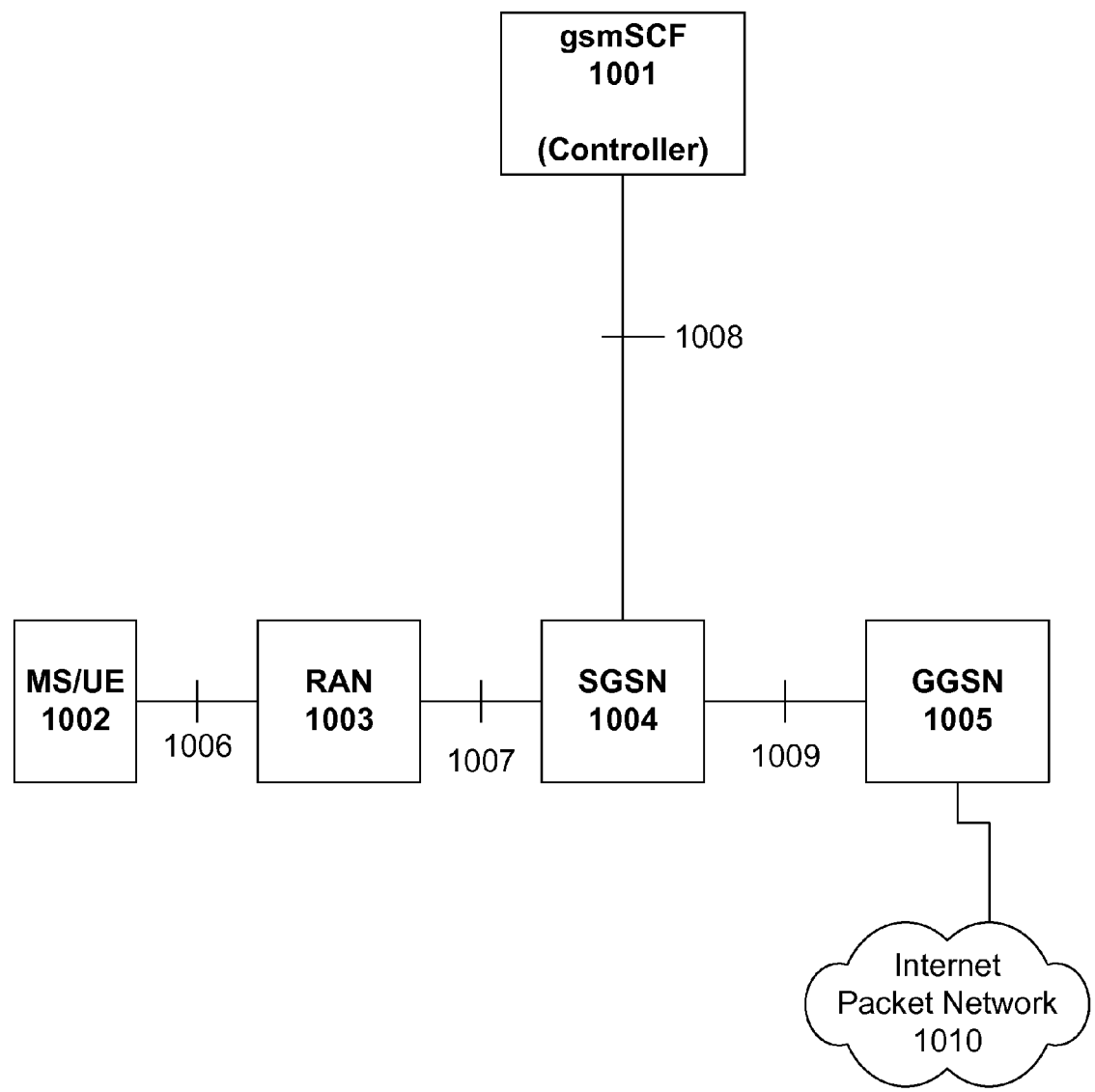
FIG. 10 schematically depicts an illustrative implementation for GPRS session control.

FIG. 10 is referenced herein to describe an illustrative implementation for GPRS session control. GPRS sessions may be blocked in the Area-of-Ambiguity both for new sessions (attach) and PDP contexts (PDP Context Establishment) based on location. In this embodiment, the Controller is resident on the gsmSCF 1001 node. The gsmSCF 1001 attaches via a CAMEL Application Part (CAP) connection 1008 to the SGSN 1004, which contains the switching service point (SSP) IN function with the basic call state machine, points-in-call, triggers and event signaling. The SGSN 1004 connects to the GSM and/or UMTS RAN (Radio Access Network) 1003 via standard interfaces 1007 (the Gs and Gb for GSM and the Iu-PS for UMTS). The RAN connects to the mobile device (MS/UE 1002) over the radio link 1006 (GSM air interface, Um, or UMTS air interface, Uu). The SGSN also connects to the Gateway GPRS Signaling Gateway (GGSN 1005) via the Gn interface 1009. The GGSN 1005 may also contain part of the service point (SSP) IN function with the basic call state machine, points-in-call, triggers and event signaling for Mobile Terminated GPSR data sessions. The GGSN 1005 connects to the external packet data network 1010 such as the public Internet.

FIG. 11

Figure 11:
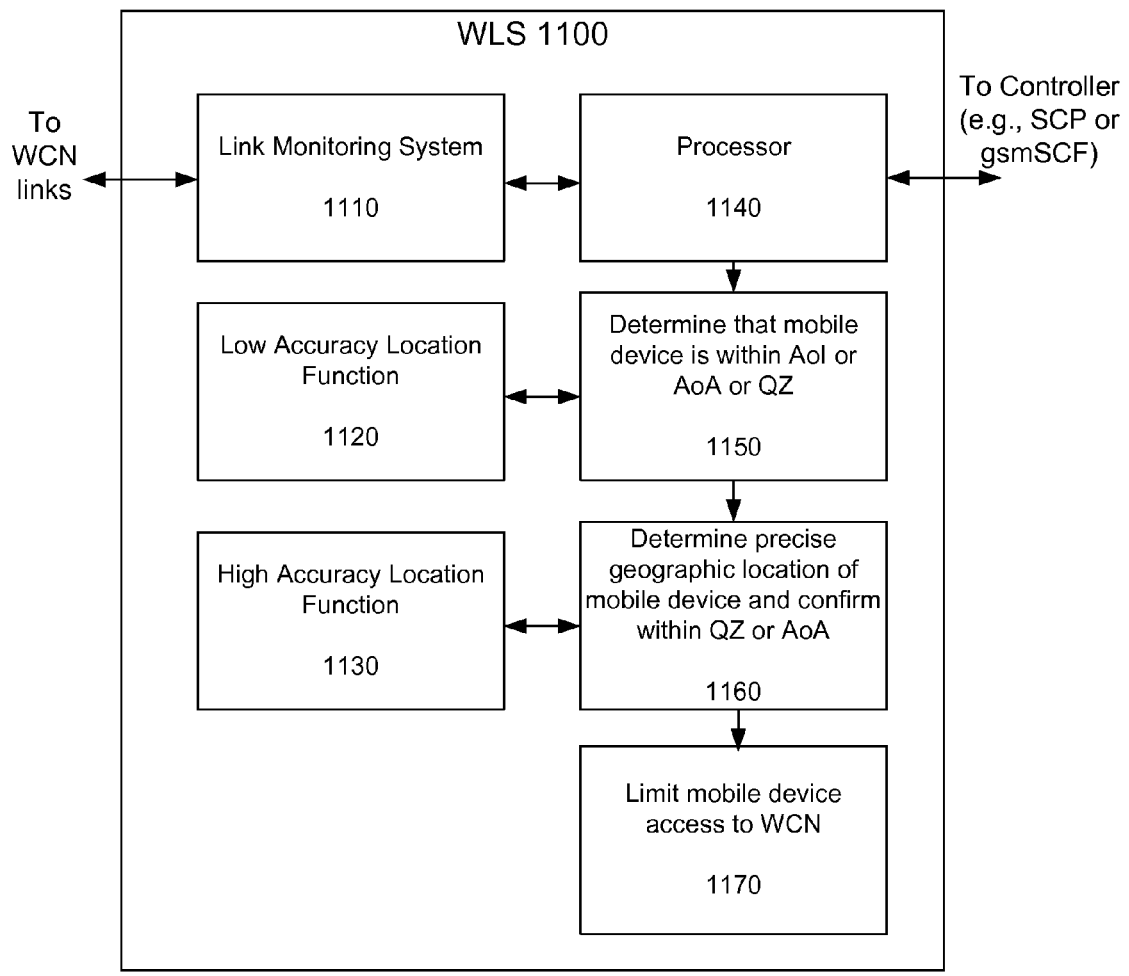
FIG. 11 schematically depicts another view of a WLS in accordance with an embodiment of the present invention.

FIG. 11 is a block diagrammatic view of a WLS 1100. The WLS 1100 includes a link monitoring system, LMS, 1110; a low-accuracy location function 1120; a high-accuracy location function 1130; and a programmable processor 1140, as shown. As described above, the processor 1140 interacts with the LMS 1110 and the low and high accuracy location functions 1120, 1130 to control a mobile device's access to an associated WCN. In particular, the LMS is configured to monitor a set of one or more predefined signaling links of at least one WCN, and to detect an event associated with the mobile device. In addition, the processor 1140 and associated software for configuring the processor operate to perform the functions of using the low-accuracy location function to determine that the mobile device is within a defined AoI and is potentially within a defined quiet zone; using the high-accuracy location function to determine a precise geographic location of the mobile device and based thereon to confirm that the said mobile device is within the quiet zone or at least within an AoA around the quiet zone; and to limit the mobile device's access to the WCN, e.g., by sending appropriate instructions or requests to a controller, SCP or gsmSCF, of the WCN.

Alternative Embodiments

Alternative Filter Order

In some deployments of the present invention, the need for non-tracking of White listed phones is paramount. Therefore the order of the Controller based filters can be changed so that the MSID analysis, comparing the MSC-delivered MSID (in GSM the IMSI) versus the White List database, is the first line filter. This change in order means that the white listed phones are never located or recorded other then "present" in the Area of Interest.

Time based, Duration Based, Temporary Zones

The present invention can be used as a permanent implementation of service denial or can be temporary or reoccurring simply by adding or removing the triggers from the MSC and SGSN.

White Listed

If the mobile identity, as discovered in any of the use cases, is listed on the LMS as permitted in the area of interest, then the system may either never enter the mobile identity as a trigger in the LMS or may not take the final interaction with the call control and thus never deny service to the permitted mobile device.

Grey Listed

If the mobile identity, as discovered in any of the use cases, is listed on the LMS as permitted in the area of interest but not immune from oversight, the mobile identity will be entered into the LMS as a trigger, but the final interaction with the call control will not be initiated and thus the system never deny service to the permitted mobile device, but the mobile location will be noted at each and every network transaction within the Area of Interest.

Black Listed

If the mobile identity, as discovered in any of the use cases, is listed on the LMS as blacklisted, the mobile identity will be entered into the LMS as a trigger and the SCP database updated. The SCP will execute call control can be immediately initiated and service to the blacklisted mobile device denied. The blacklisted mobile's location will be noted at each and every network transaction within the Area of Interest and the mobile can be periodically polled for tracking purposes with high-accuracy idle-mode location techniques.

The WLS may be configured to develop an automatic black list based on entry into the Area of Interest or an Area of Ambiguity within the Area of Interest. This blacklisting record of mobile identification and location can be sent to authorities.

Gate Entry

The WLS may be configured to develop an automatic white list or grey list based on entry through an approved gate. In this implementation, the mobile will be located with high accuracy (U-TDOA) once it crosses the Area of Interest geofence boundary. If the high-accuracy location corresponds to a permitted entry point, the mobile identity may be white listed or grey listed on the LMS.

As an alternative high-accuracy location method, a very small wireless cell (a femto-cell) may be emplaced covering the gate area. With a coverage area in the 10's of meters, location within the femto-cell results in a high accuracy location.

Call Control Exclusions

Call Control may be allowed to provide service exclusions based on location within the geo-fenced area. For instance a mobile device may still be allowed to originate calls to a specific number (such as 9-1-1, 1-1-2, 9-9-9 or any other emergency services number or short code). This could be accomplished via the Controller analysis of LMS messages or via dialed digit analysis at the MSC.

Location Prioritization

With the goal of preserving scarce location capability, a location-based prioritization scheme is envisioned. If the mobile device crosses the Area of Interest at a far distance from the Quiet Zone, that mobile may be given a lower priority and skipped from the next cycle of periodic location (if enabled). Also, devices moving at low velocity or with velocities moving the mobile device away from the Quiet Zone may be lowered in priority.

Spare Cycles

Once a mobile device has entered the Area of Interest, the high-accuracy U-TDOA network may be used in place of the low accuracy cell-ID (CGI) or cell-ID with ranging (CGI+TA) according a location-based prioritization scheme.

Out of Area of Interest

If a mobile exits the Area of Interest, the mobile's TMSI, set as a trigger within the LMS, becomes irrelevant since the monitored spans only encompass the defined area. Also the change in LAC/SAC/RAC is reciprocal and the mobile can be taken off the trigger list in the same manner it was put on if the surrounding cells spans are being monitored by the LMS.

Out of the Quiet Zone

If a mobile has entered the geo-fenced Quiet Zone area and call control was set, manual elimination of the call control may be performed by the operator, or a timer set to recheck the mobile device's location periodically using the AnyTimeInterrogation operation and series low-then-high accuracy approach described. If the mobile device is found to be out of the area-of-interest on subsequent locations, call control can be removed without operator intervention.

Conclusion

The true scope the present invention is not limited to the illustrative embodiments disclosed herein. For example, the foregoing disclosure of a Wireless Location System uses explanatory terms, such as LMU, LMS, RNM, BTS, BSC, SMLC, and the like, which should not be construed so as to limit the scope of protection of this application, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA or AoA techniques. In such non-TDOA/AoA systems, the SMLC described above would not be required to perform TDOA or AoA calculations. Similarly, the invention is not limited to systems employing LMU(s), LMS(s) and/or RNM(s) constructed in a particular manner, or to systems employing specific types of receivers, computers, signal processors, etc. The LMUs, SMLC, etc., are essentially programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the SMLC) described herein to another functional element (such as the LMU) without changing the inventive operation of the system. In many cases, the place of implementation (i.e., the functional element) described herein is merely a designer's preference and not a hard requirement. Accordingly, except as they may be expressly so limited, the scope of protection is not intended to be limited to the specific embodiments described above.

In addition, any reference herein to control channels or voice channels shall refer to all types of control or voice channels, whatever the preferred terminology for a particular air interface. Moreover, there are many more types of air interfaces (e.g., IS-95 CDMA, CDMA 2000, and UMTS WCDMA) used throughout the world, and, unless the contrary is indicated, there is no intent to exclude any air interface from the inventive concepts described within this specification. Indeed, those skilled in the art will recognize other interfaces used elsewhere are derivatives of or similar in class to those described above.

What is claimed:

1. A method for use in controlling a mobile device's access to a wireless communications network (WCN) with an overlaid wireless location system (WLS), comprising:
    monitoring a set of one or more predefined signaling links of the WCN;
    detecting an event associated with said mobile device;
    classifying the event as a periodic registration event for an idle mode device upon determining that periodic registration is enabled;
    using a low-accuracy location function of the WLS, determining that said mobile device is within a defined area of interest and is potentially within a defined quiet zone;
    using a high-accuracy location function of the WLS, determining a precise geographic location of said mobile device and based thereon determining that said mobile device is within said quiet zone; and
    limiting the mobile device's access to the WCN, said limiting comprising initiating call handling via an intelligent network associated with the WCN to indicate that, for incoming voice, SMS, or data session calls, the mobile device is unavailable.

2. A method for use in controlling a mobile device's access to a wireless communications network (WCN) with an overlaid wireless location system (WLS), comprising:
    monitoring a set of one or more predefined signaling links of the WCN;
    detecting an event associated with said mobile device;
    determining that periodic registration is not enabled;
    polling the mobile device, and determining that the mobile device is within an area of interest using a low accuracy location function of the WLS;
    using a high-accuracy location function of the WLS, determining a precise geographic location of said mobile device and based thereon determining that said mobile device is within a defined quiet zone; and
    limiting the mobile device's access to the wireless communications network, said limiting comprising initiating call handling via an intelligent network associated with the WCN to indicate that, for incoming voice, SMS, or data session calls, the mobile device is unavailable.

3. A method as recited in claim 1 or 2, wherein said limiting further comprises allowing communication but with lawful-intercept recording.

4. A method as recited in claim 1 or 2, wherein said limiting further comprises establishment of a three-way call.

5. A method as recited in claim 1 or 2, wherein said limiting further comprises re-routing of the call to a message center.

6. A method as recited in claim 1 or 2, wherein said area of interest is contained within a pre-defined geo-fence boundary, and wherein said quiet zone is within said area of interest.

7. A method as recited in claim 1 or 2, further comprising determining that said mobile device is above said quiet zone within a defined range of altitudes.

8. A method as recited in claim 1 or 2, wherein information about the speed and heading of the mobile device is employed to prioritize use of said high-accuracy location function.

9. A method as recited in claim 1 or 2, wherein said area of interest is defined as comprising subsections of adjoining cells.

10. A method as recited in claim 1 or 2, wherein said area of interest is defined as comprising subsections of sectors of adjoining cells.

11. A method as recited in claim 1 or 2, wherein said area of interest is defined as comprising subsections of adjoining wireless communications networks.

12. A method as recited in claim 1 or 2, wherein said monitoring comprises the use of a method employing a mapping of a serving cell, serving sector, or a combination of serving cell, sector and handover candidate measurements.

13. A method as recited in claim 1 or 2, wherein said use of a high-accuracy location function comprises the use of plural location measuring units (LMUs) and uplink time difference of arrival (U-TDOA) algorithms.

14. A method as recited in claim 2, wherein said event comprises a call origination event.

15. A method as recited in claim 2, wherein said event comprises a call termination event.

16. A method as recited in claim 2, wherein said event relates to a voice call.

17. A method as recited in claim 2, wherein said event relates to a short message service (SMS) call.

18. A method as recited in claim 2, wherein said event relates to a General Packet Radio Service (GPRS) data session.

19. A system for use in controlling a mobile device's access to one or more wireless communications networks (WCNs) with an overlaid wireless location system (WLS), comprising:
    a link monitoring system (LMS) configured to monitor a set of one or more predefined signaling links of a WCN, and to detect an event associated with said mobile device;
    means for classifying the event as a periodic registration event for an idle mode device;
    means for using a low-accuracy location function of the WLS to determine that said mobile device is within a defined area of interest and is potentially within a defined quiet zone;
    means for using a high-accuracy location function of the WLS to determine a precise geographic location of said mobile device and based thereon to confirm that said mobile device is within said quiet zone; and
    means for limiting the mobile device's access to the wireless communications network, including means for initiating call handling via an intelligent network associated with the WCN to indicate that, for incoming voice, SMS, or data session calls, the mobile device is unavailable.

20. A system for use in controlling a mobile device's access to one or more wireless communications networks (WCNs) with an overlaid wireless location system (WLS), comprising:

a link monitoring system (LMS) configured to monitor a set of one or more predefined signaling links of a WCN, and to detect an event associated with said mobile device;

means for determining that periodic registration is not enabled;

means for polling the mobile device;

means for using a low-accuracy location function of the WLS to determine that said mobile device is within a defined area of interest and is potentially within a defined quiet zone;

means for using a high-accuracy location function of the WLS to determine a precise geographic location of said mobile device and based thereon to confirm that said mobile device is within said quiet zone; and means for limiting the mobile device's access to the wireless communications network, including means for initiating call handling via an intelligent network associated with the WCN to indicate that, for incoming voice, SMS, or data session calls, the mobile device is unavailable.

21. A system as recited in claim 19 or 20, wherein the system is configured to allow communication but with lawful-intercept recording.

22. A system as recited in claim 19 or 20, wherein the system is configured to establish a three-way call.

23. A system as recited in claim 19 or 20, wherein the system is configured to re-route the call to a message center.

24. A system as recited in claim 19 or 20, wherein said area of interest is contained within a pre-defined geo-fence boundary, and wherein said quiet zone is within said area of interest.

25. A system as recited in claim 19 or 20, wherein the system is configured to determine that said mobile device is above said quiet zone within a defined range of altitudes.

26. A system as recited in claim 19 or 20, wherein the system is configured to use information about the speed and heading of the mobile device to prioritize use of said high-accuracy location function.

27. A system as recited in claim 19 or 20, wherein said area of interest is defined as comprising subsections of adjoining cells.

28. A system as recited in claim 19 or 20, wherein said area of interest is defined as comprising subsections of sectors of adjoining cells.

29. A system as recited in claim 19 or 20, wherein said area of interest is defined as comprising subsections of adjoining wireless communications networks.

30. A system as recited in claim 19 or 20, wherein the system is configured to use a method employing a mapping of a serving cell, serving sector, or a combination of serving cell, sector and handover candidate measurements.

31. A system as recited in claim 19 or 20, wherein the system is configured to use plural location measuring units (LMUs) and uplink time difference of arrival (U-TDOA) algorithms.

32. A system as recited in claim 20, wherein said event comprises a call origination event.

33. A system as recited in claim 20, wherein said event comprises a call termination event.

34. A system as recited in claim 20, wherein said event relates to a voice call.

35. A system as recited in claim 20, wherein said event relates to a short message service (SMS) call.

36. A system as recited in claim 20, wherein said event relates to a General Packet Radio Service (GPRS) data session.

* * * * *